US012663530B2

(12) United States Patent
You

(10) Patent No.: US 12,663,530 B2
(45) Date of Patent: Jun. 23, 2026

(54) METHOD FOR PROCESSING RADAR SENSING DATA, RADAR DEVICE, AND VEHICLE INCLUDING RADAR DEVICE

(71) Applicant: HL KLEMOVE CORP., Incheon (KR)

(72) Inventor: Kyung Jin You, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 399 days.

(21) Appl. No.: 18/195,434

(22) Filed: May 10, 2023

(65) Prior Publication Data

US 2024/0134029 A1    Apr. 25, 2024
US 2024/0230875 A9    Jul. 11, 2024

(30) Foreign Application Priority Data

Oct. 24, 2022    (KR) ........................ 10-2022-0137110

(51) Int. Cl.
*G01S 13/50*    (2006.01)
*G01S 13/524*    (2006.01)

(52) U.S. Cl.
CPC .......... *G01S 13/505* (2013.01); *G01S 13/524* (2013.01)

(58) Field of Classification Search
None
See application file for complete search history.

(56) References Cited

U.S. PATENT DOCUMENTS

| | | | | |
|---|---|---|---|---|
| 2022/0196798 A1* | 6/2022 | Chen | ........................ | G01S 7/354 |
| 2022/0268921 A1* | 8/2022 | Lovberg | .............. | G01S 13/9027 |
| 2022/0342036 A1 | 10/2022 | Rao et al. | | |
| 2024/0134002 A1* | 4/2024 | Kavousi Ghafi | ......... | G01S 7/40 |

FOREIGN PATENT DOCUMENTS

| | | |
|---|---|---|
| KR | 10-0886613 | 3/2009 |
| KR | 10-2019-0025997 | 3/2019 |
| KR | 10-2019-0058074 | 5/2019 |
| KR | 10-2288865 | 8/2021 |

OTHER PUBLICATIONS

Office Action dated Dec. 2, 2024 for Korean Patent Application No. 10-2022-0137110 and its English translation provided by Applicant's foreign counsel.
Li, Xinrong, et al.: "Signal Processing for TDM MIMO FMCW Millimeter-Wave Radar Sensors", IEEE Vehicular Technology Society Section, IEEE Access, published Dec. 22, 2021, pp. 1-13.

* cited by examiner

*Primary Examiner* — Resha Desai
*Assistant Examiner* — Brandon James Henson
(74) *Attorney, Agent, or Firm* — WOMBLE BOND DICKINSON (US) LLP

(57) ABSTRACT

Provided are a time division multiplexing (TDM) frequency modulation continuous wave (FMCW) radar device including N×M virtual channels implemented by N transmission channels (wherein N is a natural number greater than or equal to 2) and M reception channels (wherein M is a natural number greater than or equal to 2), wherein locations of at least some channels from among the N×M virtual channels overlap each other, a radar sensing data processing method of the radar device, and a vehicle including the radar device.

19 Claims, 19 Drawing Sheets

320

330

1st FFT

1st dimension: Sample Index
2nd dimension: Chirp Index
3rd dimension: Virtual Channel
4th dimension:TX Channel

1st dimension: Range Index
2nd dimension: Chirp Index
3rd dimension: Virtual Channel
4th dimension:TX Channel

Figure 5:
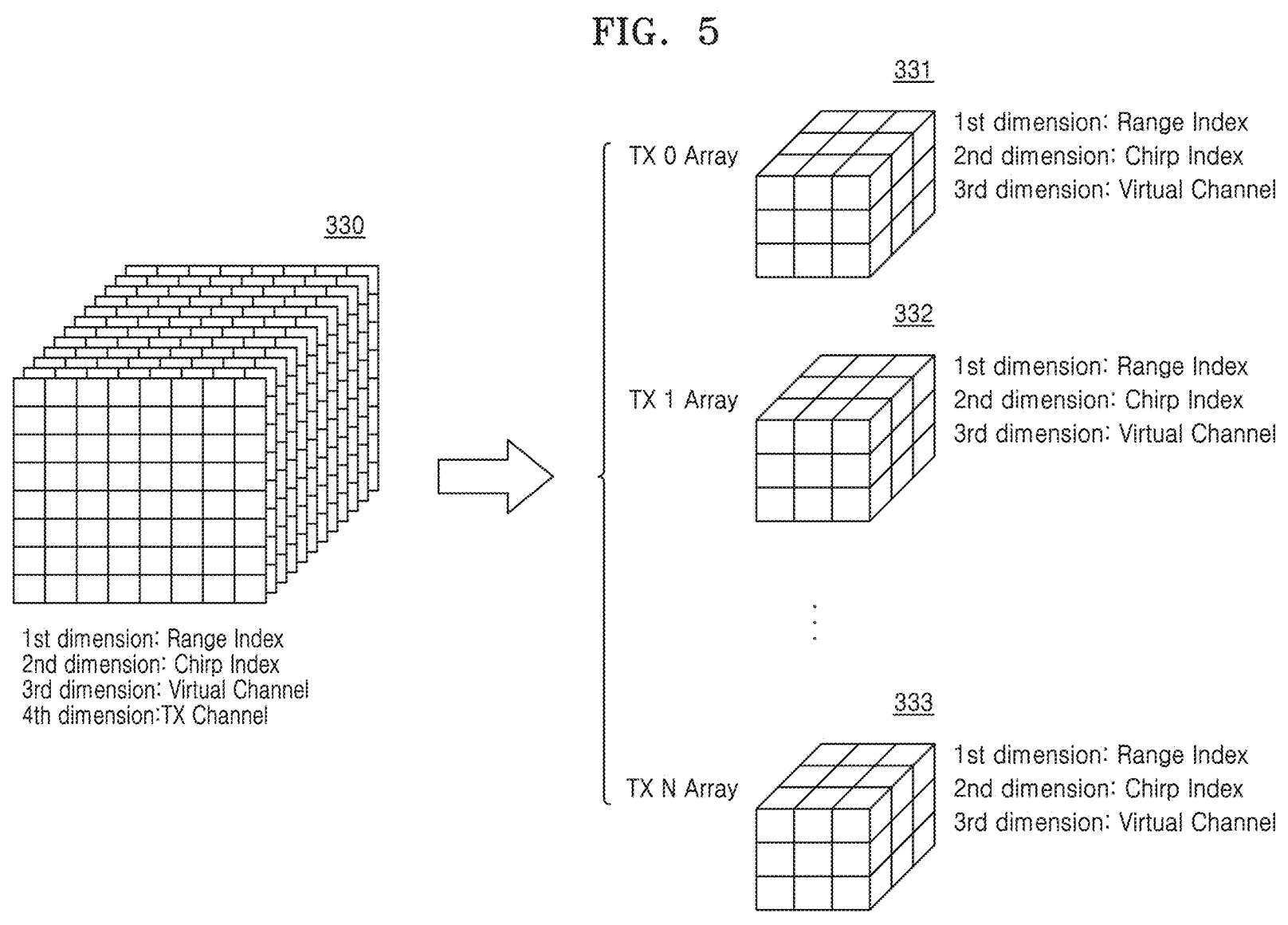

TX 0 Array

1st dimension: Range Index
2nd dimension: Chirp Index
3rd dimension: Virtual Channel

332

TX 1 Array

1st dimension: Range Index
2nd dimension: Chirp Index
3rd dimension: Virtual Channel

333

TX N Array

1st dimension: Range Index
2nd dimension: Chirp Index
3rd dimension: Virtual Channel

. . .

330

1st dimension: Range Index
2nd dimension: Chirp Index
3rd dimension: Virtual Channel
4th dimension: TX Channel

341_F

341

341_R

J-1 Zero-padding
Layer(s)

J-2 Zero-padding
Layer(s)

Range
Index

Virtual
Channel

Chirp
Index

Figure 8:
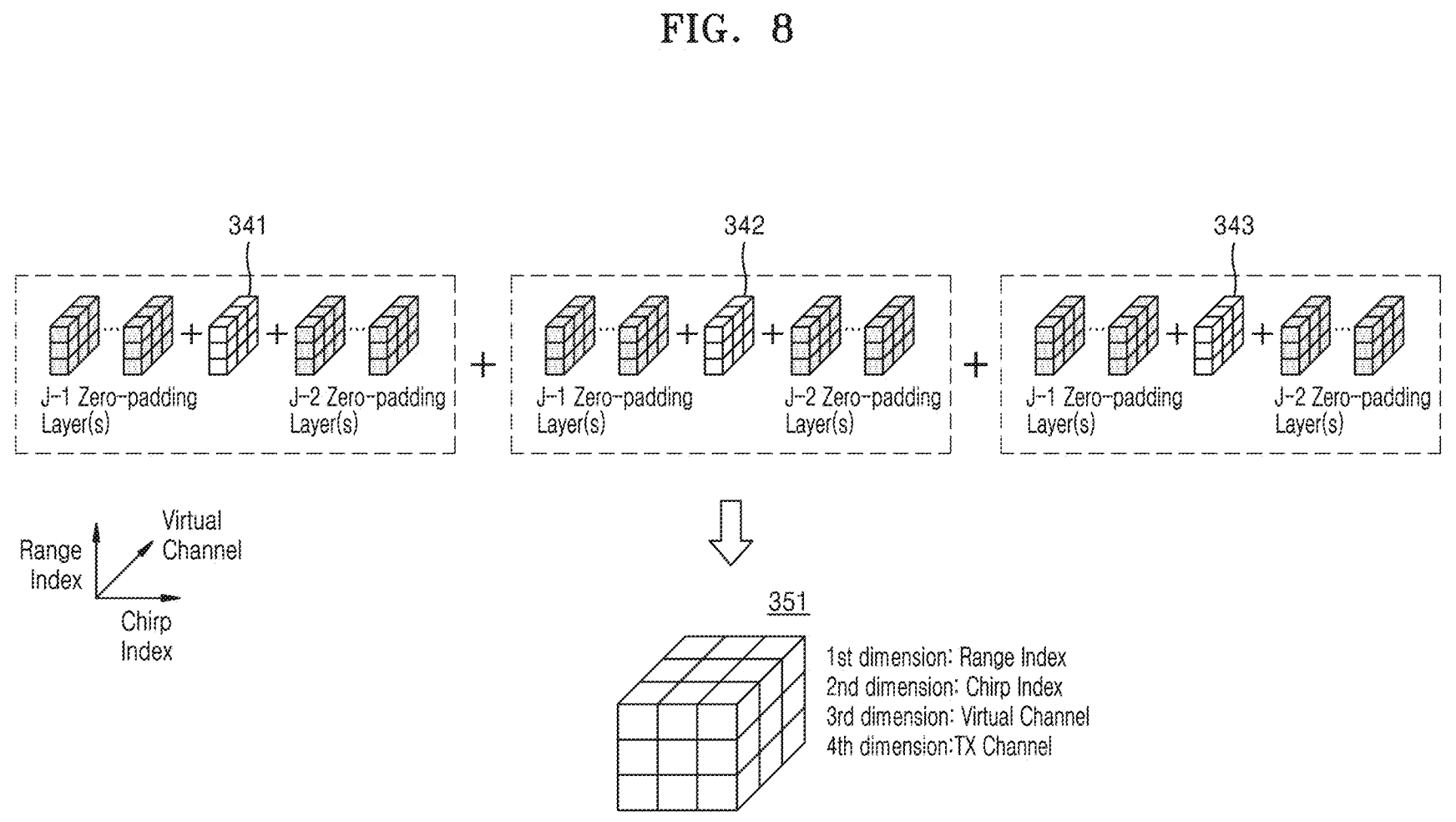

J-2 Zero-padding Layer(s)

J-1 Zero-padding Layer(s)

342

J-2 Zero-padding Layer(s)

J-1 Zero-padding Layer(s)

341

J-2 Zero-padding Layer(s)

J-1 Zero-padding Layer(s)

351

1st dimension: Range Index
2nd dimension: Chirp Index
3rd dimension: Virtual Channel
4th dimension: TX Channel Range Index
Virtual Channel
Chirp Index 1st dimension: Range Index
2nd dimension: Chirp Index
3rd dimension: Virtual Channel
4th dimension:TX Channel 1st dimension: Range Index
2nd dimension: Chirp Index
3rd dimension: Virtual Channel
4th dimension: TX Channel

360

391    392    393

371    372    373

TX 0, VC 0 Array

TX 0, VC 1 Array

TX N, VC NxM Array

360

410

2nd FFT

1st dimension: Sample Index
2nd dimension: Chirp Index
3rd dimension: Virtual Channel
4th dimension:TX Channel 1st dimension: Range Index
2nd dimension: Doppler Index
3rd dimension: Virtual Channel
4th dimension:TX Channel

METHOD FOR PROCESSING RADAR SENSING DATA, RADAR DEVICE, AND VEHICLE INCLUDING RADAR DEVICE

STATEMENT REGARDING GOVERNMENT SPONSORED RESEARCH OR DEVELOPMENT

This work was supported by the Technology Innovation Program (or Industrial Strategic Technology Development Program, No. 20014098, Development of 4D Imaging Radar Sensor Module for Autonomous Driving) funded By the Ministry of Trade, Industry & Energy (MOTIE, Korea).

CROSS-REFERENCE TO RELATED APPLICATION

This application is based on and claims priority under 35 U.S.C. § 119 to Korean Patent Application No. 10-2022-0137110, filed on Oct. 24, 2022, in the Korean Intellectual Property Office, the disclosure of which is incorporated by reference herein in its entirety.

BACKGROUND

1. Technical Field

The present disclosure generally relates to a time division multiplexing (TDM) frequency modulation continuous wave (FMCW) radar device, a radar sensing data processing method of the radar device, and a vehicle including the radar device.

2. Description of the Related Art

Multi input multi output (MIMO) frequency modulation continuous wave (FMCW) radar systems using time division multiplexing (TDM) schemes have greater limitations in measuring the speeds of targets, including movement directions of objects, because Doppler ambiguity increases in proportion to the number of transmitters.

Accordingly, existing technologies have used methods of allowing signals transmitted via respective transmission channels to have unique phases, changing waveforms of transmission signals, using additional chirp sequences, and the like.

However, these conventional methods may require additional processing, such as phase distortion and waveform distortion.

SUMMARY

Provided is a method of reducing or overcoming speed ambiguity without additional processing.

Additional aspects will be set forth in part in the description which follows and, in part, will be apparent from the description, or may be learned by practice of the presented embodiments of the disclosure.

According to an aspect of the disclosure, a radar sensing data processing method of a time division multiplexing (TDM) frequency modulation continuous wave (FMCW) radar device including N×M virtual channels implemented by N transmission channels (wherein N is a natural number greater than or equal to 2) and M reception channels (wherein M is a natural number greater than or equal to 2), locations of at least some channels from among the N×M virtual channels overlapping each other, includes generating a first array by using a signal emitted and a signal received by the radar device, the first array being a four-dimensional array having a sampling index, a chirp index, a virtual channel, and a transmission channel, as dimensions, respectively, generating a second array by performing, in a sampling index dimension direction, range fast Fourier transform (FFT) on each virtual channel of each of N transmission channels of the first array, the second array being a four-dimensional array having a range index, a chirp index, a virtual channel, and a transmission channel as dimensions, respectively, generating a third array by adding, in a chirp index dimension direction, predetermined data to the second array according to different methods on the basis of the N transmission channels, generating a fourth array by performing, in a chirp index dimension direction, FFT on each virtual channel of each of the N transmission channels of the third array, the fourth array being a four-dimensional array having a range index, a Doppler index, a virtual channel, and a transmission channel as dimensions, respectively, generating a range-Doppler map from the fourth array, extracting, from the range-Doppler map, L peaks (wherein L is a natural number) having a range index and a Doppler index satisfying a predetermined condition, extracting, from among the L peaks, at least one peak having a phase difference, which is less than a predetermined threshold difference, on two adjacent virtual channels, and determining at least one physical quantity related to movement of an object by using the extracted peak.

The generating the third array may include generating, from the second array, N first partial arrays which are arrays for the respective N transmission channels, dividing each of the N first partial arrays into K two-dimensional layers (wherein K is a natural number) defined by axes of a range index dimension and a virtual channel dimension on the basis of a chirp index, adding, in a chirp index direction, at least one zero-padding layer to each of the K two-dimensional layers of each of the N first partial arrays, the zero-padding layer being a layer defined by axes of a range index dimension and a virtual channel dimension and including only 0, and generating the third array by generating N zero-padded partial arrays for each of the N first partial arrays by merging the K two-dimensional layers and the added at least one zero-padding layer and merging the N zero-padded partial arrays.

The adding the at least one zero-padding layer may include identifying a sequence number J (wherein J is a natural number) which is a sequence number of a transmission channel of a first partial array to which the zero-padding layer is to be added, adding, in a chirp index direction, J-1 preceding zero-padding layers to each of the K two-dimensional layers, and adding, in a chirp index direction, J-2 following zero-padding layers to each of the K two-dimensional layers.

The generating the third array may include generating, from the second array, N×N×M second partial arrays which are arrays for respective N×M virtual channels for the respective N transmission channels, generating C columns from each of the second partial arrays, each of the C columns being obtained by dividing each of the second partial arrays on the basis of a chirp index, adding at least one zero-padding column to each of the C columns, the zero-padding column being a column including only 0, and generating the third array by generating zero-padded partial arrays for each of the second partial arrays by merging the C columns and the added at least one zero-padding column and merging the Zero-padded partial arrays.

The adding the at least one zero-padding column may include identifying a sequence number P (wherein P is a natural number) which is a sequence number of a transmission channel of a second partial array to which the zero-padding column is to be added, adding, in a chirp index direction, P-1 preceding zero-padding columns to each of the C columns, and adding, in a chirp index direction, P-2 following zero-padding columns to each of the C columns.

The generating the range-Doppler map may include generating, from the fourth array, first range-Doppler maps for respective virtual channels by merging Doppler FFT results for the respective N transmission channels on the basis of the respective virtual channels, and generating a second range-Doppler map by merging the first range-Doppler maps for the respective virtual channels. The extracting the L peaks may include extracting the L peaks from the second range-Doppler map.

The generating the range-Doppler map may further include generating a third range-Doppler map on the basis of at least one of the first range-Doppler maps for the respective virtual channels, wherein the extracting the L peaks includes extracting the L peaks from the third range-Doppler map.

A predetermined condition for extracting the L peaks may include a condition in which Doppler indexes between the L peaks have intervals corresponding to a predetermined interval, and range index values of the L peaks are within a threshold difference from a range index value of any one of the L peaks.

The extracting the at least one peak may include identifying phases of the respective L peaks on respective virtual channels, calculating, for each of the L peaks, a phase difference between two adjacent virtual channels, and extracting, from among the L peaks, a peak having a minimum value from among the calculated phase differences.

According to another aspect of the disclosure, a TDM FMCW radar device includes an antenna unit including N transmission antennas (wherein N is a natural number greater than or equal to 2), M reception antennas (wherein M is a natural number greater than or equal to 2), and N×M virtual antennas implemented according to an array of the N transmission antennas and the M reception antennas, locations of at least some channels from among the N×M virtual antennas overlapping each other, a radar integrated circuit (IC) configured to process a series of signals transmitted and received by the antenna unit and provide the processed signals to a processor, and the processor configured to determine at least one physical quantity related to movement of an object by transmitting a signal via the antenna unit and analyzing a reflected signal.

The processor may be configured to generate a first array by using a signal emitted and a signal received via the antenna unit, the first array being a four-dimensional array having a sampling index, a chirp index, a virtual channel, and a transmission channel as dimensions, respectively, generate a second array by performing, in a sampling index dimension direction, range fast Fourier transform (FFT) on each virtual channel of each of N transmission channels of the first array, the second array being a four-dimensional array having a range index, a chirp index, a virtual channel, and a transmission channel as dimensions, respectively, generate a third array by adding, in a chirp index dimension direction, predetermined data to the second array according to different methods on the basis of the N transmission channels, generate a fourth array by performing, in a chirp index dimension direction, FFT on each virtual channel of each of the N transmission channels of the third array, the fourth array being a four-dimensional array having a range index, a Doppler index, a virtual channel, and a transmission channel as dimensions, respectively, generate a range-Doppler map from the fourth array, extract, from the range-Doppler map, L peaks (wherein L is a natural number) having a range index and a Doppler index satisfying a predetermined condition, extract, from among the L peaks, at least one peak having a phase difference, which is less than a predetermined threshold difference, on two adjacent virtual channels, and determine at least one physical quantity related to the movement of the object by using the extracted peak.

The processor may be configured to generate, from the second array, N first partial arrays which are arrays for the respective N transmission channels, dividing each of the N first partial arrays into K two-dimensional layers (wherein K is a natural number) defined by axes of a range index dimension and a virtual channel dimension on the basis of a chirp index, add, in a chirp index direction, at least one zero-padding layer to each of the K two-dimensional layers of each of the N first partial arrays, the zero-padding layer being a layer defined by axes of a range index dimension and a virtual channel dimension and including only 0, and generate the third array by generating N zero-padded partial arrays for each of the N first partial arrays by merging the K two-dimensional layers and the added at least one zero-padding layer and merging the N zero-padded partial arrays.

The processor may be configured to identify a sequence number J (wherein J is a natural number) which is a sequence number of a transmission channel of a first partial array to which the zero-padding layer is to be added, add, in a chirp index direction, J-1 preceding zero-padding layers to each of the K two-dimensional layers, and add, in a chirp index direction, J-2 following zero-padding layers to each of the K two-dimensional layers.

The processor may be configured to generate, from the second array, N×N×M second partial arrays which are arrays of respective N×M virtual channels for the respective N transmission channels, generate C columns from each of the second partial arrays, each of the C columns being obtained by dividing each of the second partial arrays on the basis of a chirp index, add at least one zero-padding column to each of the C columns, the zero-padding column being a column including only 0, and generate the third array by generating zero-padded partial arrays for each of the second partial arrays by merging the C columns and the added at least one zero-padding column and merging the zero-padded partial arrays.

The processor may be configured to identify a sequence number P (wherein P is a natural number) which is a sequence number of a transmission channel of a second partial array to which the zero-padding column is to be added, add, in a chirp index direction, P-1 preceding zero-padding columns to each of the C columns, and adding, in a chirp index direction, P-2 following zero-padding columns to each of the C columns.

The processor may be configured to generate, from the fourth array, first range-Doppler maps for respective virtual channel by merging Doppler FFT results for the respective N transmission channels on the basis of the respective virtual channels, generate a second range-Doppler map by merging the first range-Doppler maps for the respective virtual channels, and extract the L peaks from the second range-Doppler map.

The processor may be configured to generate a third range-Doppler map on the basis of at least one of the first range-Doppler maps for the respective virtual channels, and extract the L peaks from the third range-Doppler map.

A predetermined condition for extracting the L peaks may include a condition in which Doppler indexes between the L peaks have intervals corresponding to a predetermined interval, and range index values of the L peaks are within a threshold difference from a range index value of any one of the L peaks.

The processor may be configured to identify phases of the respective L peaks on respective virtual channels, calculate, for each of the L peaks, a phase difference between two adjacent virtual channels, and extract, from among the L peaks, a peak having a minimum value from among the calculated phase differences.

According to another aspect of the disclosure, a vehicle including a radar device includes a vehicle body including a movement control unit, and the radar device configured to provide surrounding object sensing information via the movement control unit, wherein the radar device includes an antenna unit including N transmission antennas (wherein N is a natural number greater than or equal to 2), M reception antennas (wherein M is a natural number greater than or equal to 2), and N×M virtual antennas implemented according to an array of the N transmission antennas and the M reception antennas, locations of at least some channels from among the N×M virtual antennas overlapping each other, a radar integrated circuit (IC) configured to process a series of signals transmitted and received by the antenna unit and provide the processed signals to a processor, and the processor configured to determine at least one physical quantity related to movement of an object by transmitting a signal via the antenna unit and analyzing a reflected signal.

The processor may be configured to generate a first array by using a signal emitted and a signal received via the antenna unit, the first array being a four-dimensional array having a sampling index, a chirp index, a virtual channel, and a transmission channel, as dimensions, respectively, generate a second array by performing, in a sampling index dimension direction, range fast Fourier transform (FFT) on each virtual channel of each of N transmission channels of the first array, the second array being a four-dimensional array having a range index, a chirp index, a virtual channel, and a transmission channel as dimensions, respectively, generate a third array by adding, in a chirp index dimension direction, predetermined data to the second array according to different methods on the basis of the N transmission channels, generate a fourth array by performing, in a chirp index dimension direction, FFT on each virtual channel of each of the N transmission channels of the third array, the fourth array being a four-dimensional array having a range index, a Doppler index, a virtual channel, and a transmission channel as dimension, respectively, generate a range-Doppler map from the fourth array, extract, from the range-Doppler map, L peaks (wherein L is a natural number) having a range index and a Doppler index satisfying a predetermined condition, extract, from among the L peaks, at least one peak having a phase difference, which is less than a predetermined threshold difference, on two adjacent virtual channels, and determine at least one physical quantity related to movement of the object by using the extracted peak.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5 to 9 are views for illustrating a method of generating a third array, according to an embodiment of the present disclosure;

DETAILED DESCRIPTION

Figure 1:
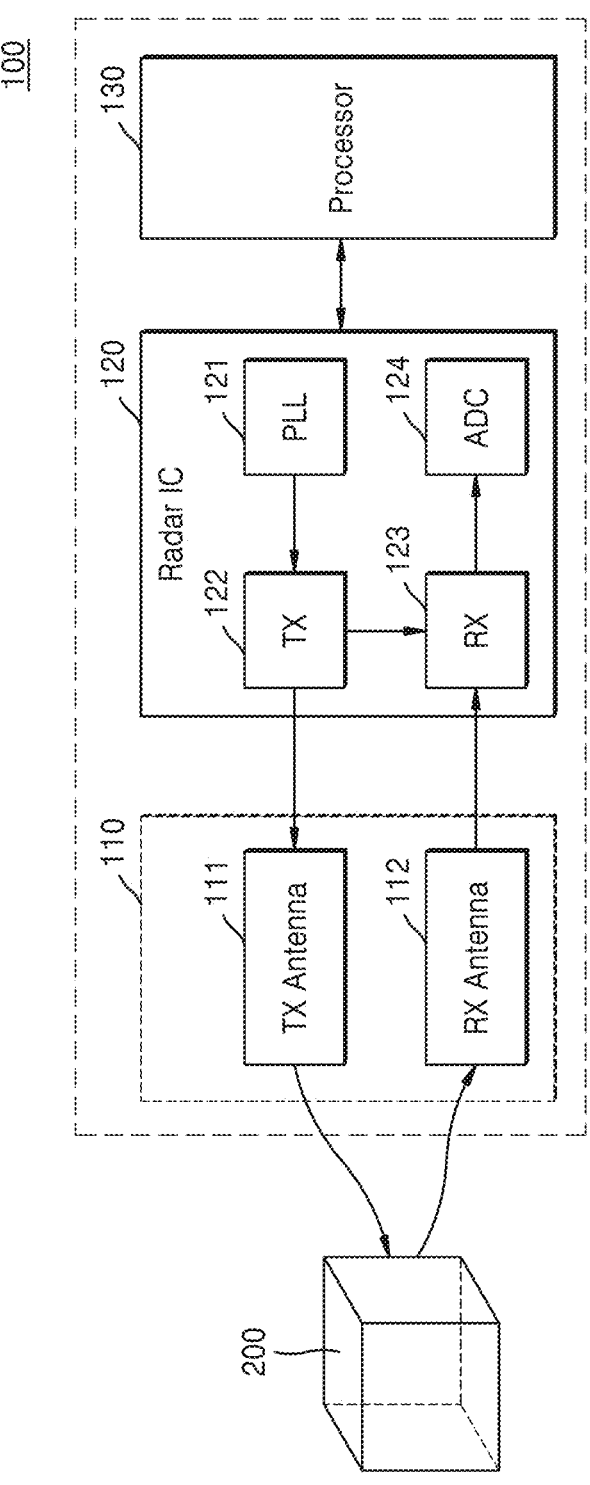
FIG. 1 is a block diagram for illustrating a structure of a radar device according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

While the disclosure allows for various modifications and has various embodiments, particular embodiments thereof are shown by way of example in the drawings and will herein be described in detail. Effects and features of the disclosure, and methods of achieving the same will be apparent with reference to embodiments described below in detail together with the drawings. However, the disclosure is not limited to the embodiments disclosed below, but may be implemented in various forms.

Hereinafter, embodiments will be described in detail with reference to the accompanying drawings, and when describing with reference to the drawings, the same or corresponding components are denoted by the same reference numerals, and the same description thereof will be omitted.

The terms, first, second, etc. are used herein for the purpose of distinguishing one component from another component without limiting the meaning. As used herein, the singular forms are intended to include the plural forms as well, unless the context clearly indicates otherwise. The terms "comprises," "comprising," "includes," "including," "has," and/or "having" when used herein, specify the presence of stated features or elements, and/or components, but do not preclude the presence or addition of one or more other features, elements, and/or components. In the drawings, the sizes of components may be exaggerated or reduced for convenience of description. For example, since the sizes and shapes of respective components illustrated in the drawings are arbitrarily shown for convenience of description, the disclosure is not necessarily limited to those illustrated.

FIG. 1 is a block diagram for illustrating a structure of a radar device 100 according to an embodiment of the present disclosure.

The radar device 100 according to an embodiment may include an antenna device in which locations of at least some of a plurality of virtual channels generated according to an antenna array overlap each other and time division multiplexing (TDM) and frequency modulation continuous wave (FMCW) schemes are complied.

The radar device 100 according to an embodiment may provide a more accurate sensing result by overcoming or reducing speed ambiguity occurring during processing of radar sensing data by using characteristics of a channel and characteristics of a radar scheme.

The radar device 100 according to an embodiment may be provided on or in a vehicle (not shown) and may be used by the vehicle to control movement of the vehicle. For example, the radar device 100 may be provided in a vehicle, and may be used for a movement control unit of the vehicle (or a controller for controlling movement of the vehicle) to determine a movement path, a movement speed, a movement direction, and the like of the vehicle. However, the provision and use of the radar device 100 are an example for illustration purposes only, and the spirit of the disclosure is not limited thereto. The movement control unit or controller may include, for example, but not be limited to, a processor, computer, digital signal processor (DSP), memory, storage, register, timing, interrupt, communication interface, and input/output signal interfaces, and the like, as well as combinations comprising at least one of the foregoing. For example, the movement control unit or controller may comprise a processor, a storage medium and/or programmable memory, which are capable of storing and executing one or more algorithms, commands, signals, instructions or methods to effect control of the vehicle. The movement control unit or controller may be in communication with numerous sensors, communication systems, and other electronic control units (ECU) of the vehicle.

In an embodiment, the radar device 100 may be implemented as a portion of a movement control unit or a controller of a vehicle. In other words, in an embodiment of the present disclosure, a movement control unit or a controller of a vehicle may be implemented to operate in the same manner as the radar device 100 described in the disclosure. In this case, a radar sensing data processing method described below may be performed by a movement control unit or a controller of a vehicle. However, hereinafter, for convenience of description, the radar device 100 will be described as a separate device distinguished from a vehicle and/or a movement control unit, although not required.

Referring to FIG. 1, the radar device 100 according to an embodiment may include an antenna unit 110, a radar integrated circuit (IC) 120, and a processor 130.

The antenna unit 110 according to an embodiment may transmit a signal to an object 200 and receive a signal reflected from the object 200 under control by the radar IC 120 and/or the processor 130. The antenna unit 110 according to an embodiment may include a plurality of transmission antennas 111 and a plurality of reception antennas 112. For example, the antenna unit 110 may be configured to include N transmission antennas and M reception antennas. Here, the antenna unit 110 may be implemented in the form of an array antenna in which a plurality of antennas are arrayed on one or more printed circuit board (PCB) substrates. However, the array of the antenna unit 110 is an example for illustration purposes only, and the spirit of the present disclosure is not limited thereto.

In the disclosure, sometimes "antenna" and "channel" may be used in the same meaning. For example, a plurality of virtual antennas and a plurality of virtual channels may be used in the same meaning.

Figure 2:
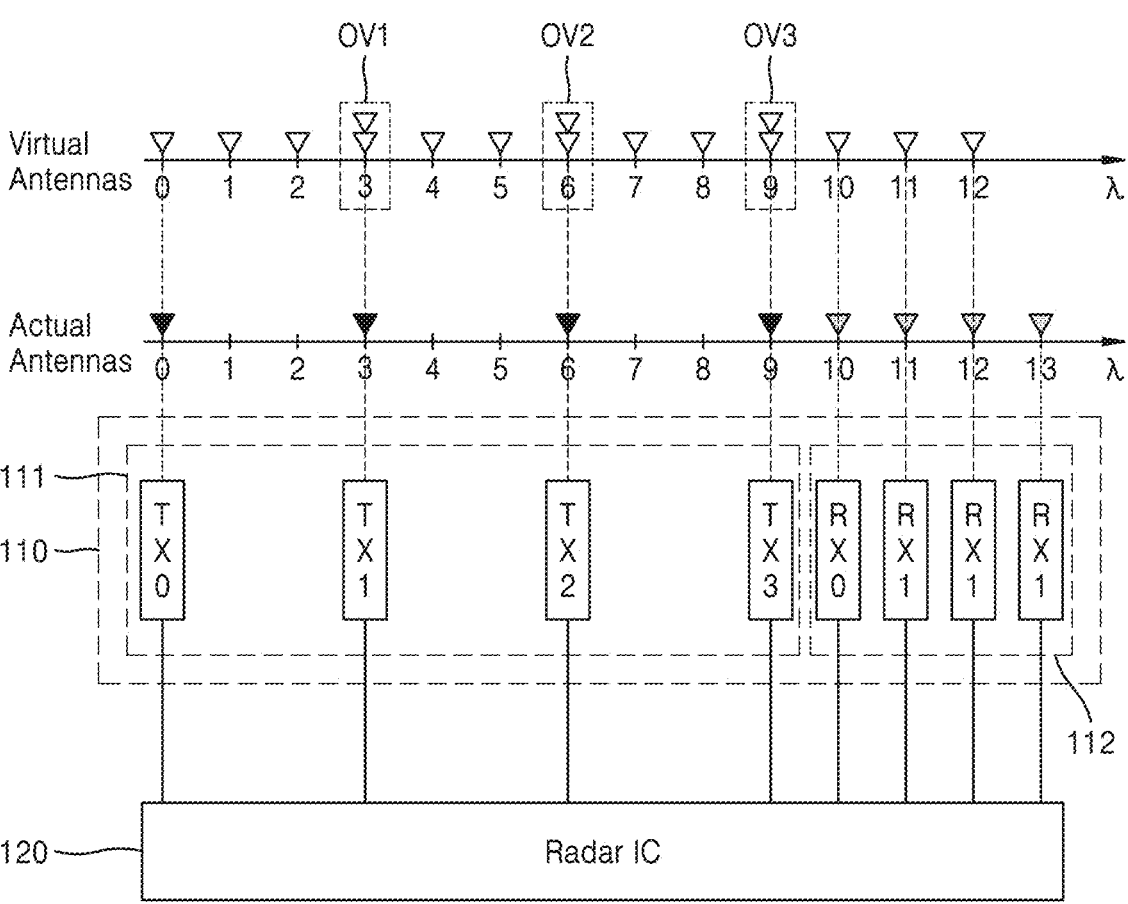
FIG. 2 is a view for illustrating an example structure of an antenna unit according to an embodiment of the present disclosure.

FIG. 2 is a view for illustrating an example structure of the antenna unit 110 according to an embodiment of the present disclosure.

As used herein, for convenience of description, in the present embodiment, a plurality of transmission antennas 111 include four individual antennas and a plurality of reception antennas 112 also include four individual antennas, and therefore a total of eight antennas are arrayed on a straight line.

In addition, as described herein, the plurality of transmission antennas 111 may be arrayed at three intervals, and the plurality of reception antennas 112 may be arrayed at one interval starting from a location one away from a last transmission antenna TX3.

In addition, as illustrated in FIG. 2, a virtual antenna array including a total of 16 virtual antennas may be generated, and three pairs of overlapping virtual antennas OV1, OV2, and OV3 may be generated.

However, the array and configuration of antennas described above are examples for illustration purposes only, and the spirit of the present disclosure is not limited thereto. Therefore, when virtual antennas generated by an array of a plurality of transmission antennas and a plurality of reception antennas overlap each other at least at some locations or areas, the overlapping virtual antennas may correspond to the antenna unit 110 of the disclosure.

Referring to FIG. 1 again, the radar IC 120 according to an embodiment may be configured to process a series of signals transmitted and received by the antenna unit 110 and provide the processed signals to the processor 130.

As illustrated in FIG. 1, the radar IC 120 may include a phase-locked loop (PLL) 121, a transmitter 122, a receiver 123, and an analog-to-digital converter (ADC) 124.

The PLL 121 and the transmitter 122 according to an embodiment may generate a transmission signal according to a control signal generated by the processor 130 and transmit the generated transmission signal to the plurality of transmission antennas 111. The plurality of transmission antennas 111 may transmit the transmission signal, transmitted from the PLL 121 and the transmitter 122, to the object 200, and the signal, transmitted by the transmission antennas 111, may be reflected from the object 200 and received by the plurality of reception antennas 112.

The receiver 123 according to an embodiment receives the reflected signal via the plurality of reception antennas 112 and transmits the received reflected signal to the ADC 124.

The ADC 124 according to an embodiment may convert the reflected signal and/or the transmission signal into a digital signal, and transmit the converted digital signal to the processor 130. The processor 130 may determine, on the basis of the digital signal, at least one physical quantity related to movement of the object 200.

Meanwhile, the structure of the radar IC 120 shown in FIG. 1 is an example for illustration purposes only, the spirit of the present disclosure is not limited thereto, and the radar IC 120 may further include additional components. For example, the radar IC 120 may further include at least one of an oscillator (not shown) for generating a transmission signal, a low-noise amplifier (not shown) for performing low-noise amplification on a received reflected signal, a mixer (not shown) for mixing the low-noise amplified reflected signals, and an amplifier (not shown) for amplifying the mixed reflected signal.

The processor 130 according to an embodiment may be configured to control operations of the radar device 100, and control to perform a series of processes for transmitting a signal, analyzing a reflected signal, and determining at least one physical quantity related to movement of an object.

Here, the processor 130 may refer to, for example, but not limited to, a data processing device embedded in hardware, which has a circuit physically structuralized to perform a function or operation expressed by a code or command included in a program. Examples of the data processing device embedded in hardware include processing devices, such as a microprocessor, a central processing unit (CPU), a processor core, a multiprocessor, an application-specific integrated circuit (ASIC), and a field programmable gate array (FPGA), but the scope of the present disclosure is not limited thereto.

For convenience of description, FIGS. 1 and 2 illustrate that the antenna unit 110, the radar IC 120, and the processor 130 of the radar device 100 are distinguished or separated from one another, but the spirit of the present disclosure is not limited thereto. Accordingly, some components of the radar device 100 may be implemented in the form integrated or merged with each other. For example, the radar IC 120 and the processor 130 may also be implemented in the form of one IC. However, the implementation is an example for illustration purposes only, and the spirit of the present disclosure is not limited thereto.

Hereinafter, a process of processing sensed radar data by the processor 130 will be mainly described.

Figure 3:
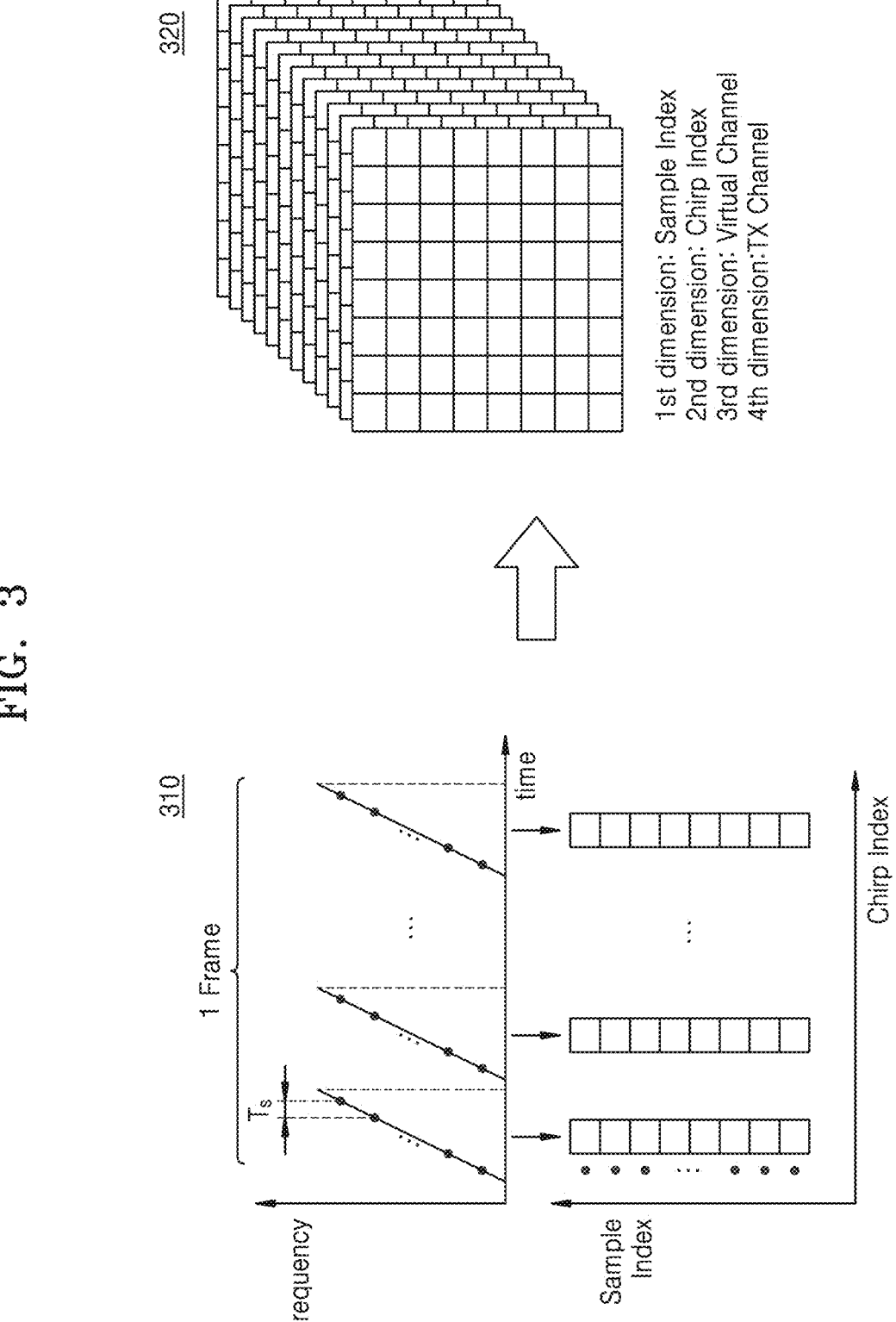
FIG. 3 is a view for illustrating a process of generating a first array by a processor, according to an embodiment of the present disclosure.

FIG. 3 is a view for illustrating a process of generating a first array 320 by the processor 130, according to an embodiment of the present disclosure.

The processor 130 according to an embodiment may transmit and receive a signal in units of frames. Here, one frame may include processes of transmitting a signal via each of a plurality of transmission channels and receiving a reflected signal via a plurality of virtual channels. For example, one frame may include a process of transmitting a signal via each of four transmission channels and a process of receiving a reflected signal via sixteen virtual channels.

The processor 130 according to an embodiment may generate a bit signal 310 on the basis of a transmission signal and a reflected signal. The processor 130 according to an embodiment may sample the bit signal 310 according to a predetermined sampling interval Ts.

The processor 130 according to an embodiment may generate the first array 320 by using a sampling value of the bit signal 310. Here, the first array 320 may refer to a four-dimensional array having a sampling index, a chirp index, a virtual channel, and a transmission channel as dimensions, respectively. Here, the sampling index may be a reference number indicating a sampling sequence number, and the chirp index may be a reference number indicating a sequence number of a chirp in one frame.

Figure 4:
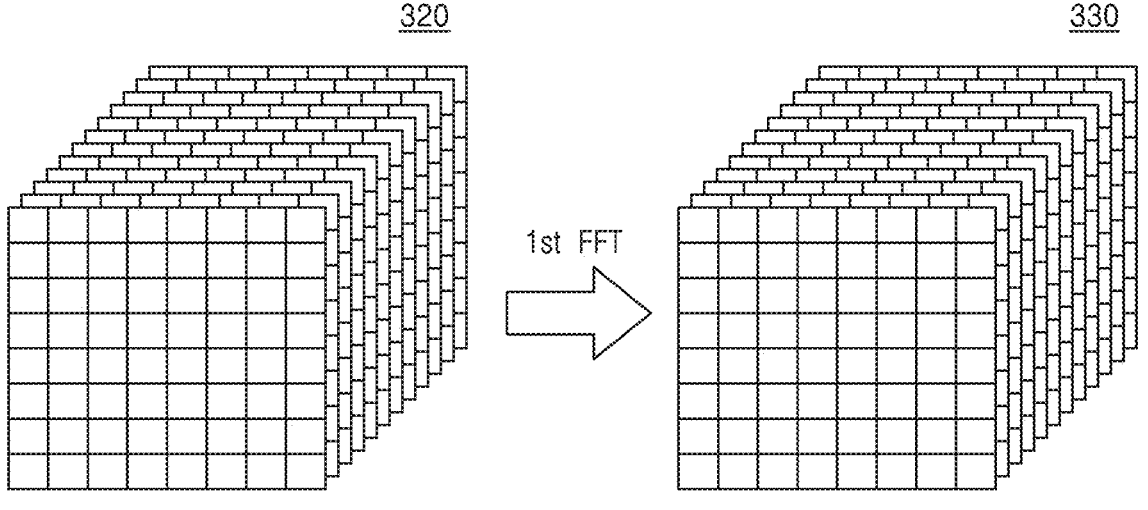
FIG. 4 is a view for illustrating a process of generating a second array by a processor, according to an embodiment of the present disclosure.

FIG. 4 is a view for illustrating a process of generating a second array by the processor 130, according to an embodiment of the present disclosure.

The processor 130 according to an embodiment may generate a second array 330 by performing, in a sampling index dimension direction, range fast Fourier transform (FFT) on each virtual channel of each of N transmission channels of the first array 320 generated according to the above-described process. Here, the second array 330 may be a four-dimensional array having a range index, a chirp index, a virtual channel, and a transmission channel as dimensions, respectively.

The processor 130 according to an embodiment may generate a third array by adding, on the basis of N transmission channels, predetermined data to the second array 330 in a chirp index dimension direction according to different methods. Here, adding data on the basis of N transmission channels may refer to adding data to the same transmission channels in the same manner.

FIGS. 5 to 9 are views illustrating a method of generating a third array, according to an embodiment of the present disclosure. Hereinafter, the method will be described with reference to FIGS. 5 to 9 together.

The processor 130 according to an embodiment may generate, from a second array 330, N first partial arrays 331, 332, and 333 which are arrays for respective N transmission channels. Here, each of the N first partial arrays 331, 332, and 333 may be a three-dimensional array in which a transmission channel dimension is removed from the second array 330, and may have a range index, a chirp index, and a virtual channel as dimensions, respectively. For example, in an embodiment in which N is 4, the processor 130 may generate four first partial arrays.

Figure 6:
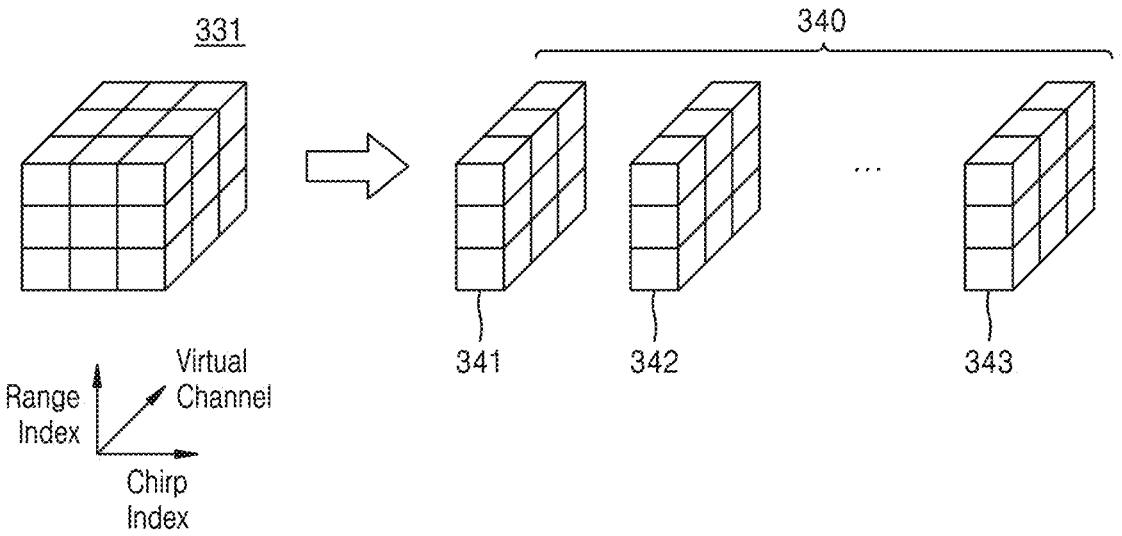

Subsequently, the processor 130 according to an embodiment may divide each of the generated N first partial arrays 331, 332, and 333 into K two-dimensional layers (wherein K is a natural number) defined by axes of a range index dimension and a virtual channel dimension on the basis of a chirp index. For example, as illustrated in FIG. 6, the processor 130 may generate the K two-dimensional layers 340 from a first partial array 331. Here, the K two-dimensional layers 340 may include one or more individual layers 341, 342, and 343.

Figure 7:
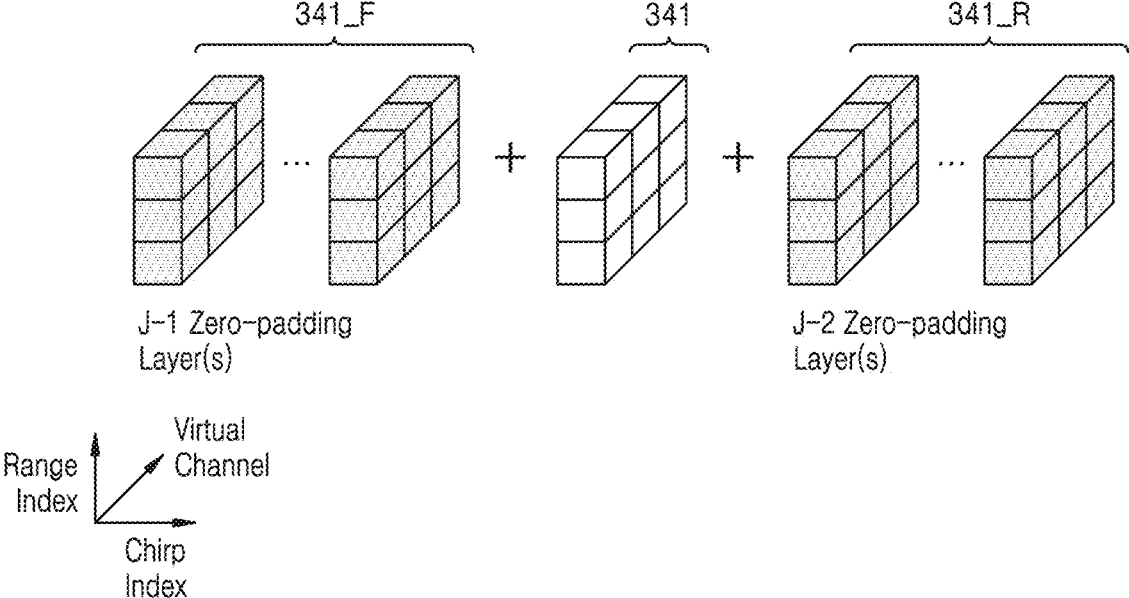

The processor 130 according to an embodiment may add, in a chirp index direction, at least one zero-padding layer to each of the K two-dimensional layers of each of the N first partial arrays 331, 332, and 333. Here, the zero-padding layer may be a layer that is defined by axes of a range index dimension and a virtual channel dimension and includes only zero. For example, as illustrated in FIG. 7, the processor 130 may add, in a chirp index direction, at least one zero-padding layer 341_F and 341_R to a first two-dimensional layer 341 generated from the first partial array 331.

In more detail, the processor 130 according to an embodiment may identify a sequence number J (wherein J is a natural number) which is a sequence number of a transmission channel of a first partial array to which a zero-padding layer is to be added. The processor 130 may add, in a chirp index direction, J-1 preceding zero-padding layers 341_F to each of K two-dimensional layers. The processor 130 may add, in the chirp index direction, J-2 following zero-padding layers 341_R to each of the K two-dimensional layers.

For example, for a first partial array in which N is 4 and J is 1, the processor 130 may add '0' preceding zero-padding layers 341_F and three following zero-padding layers 341_R to each of K two-dimensional layers.

Meanwhile, in the disclosure, 'K' may correspond to a value obtained by dividing the number of chirps included in one frame by the number 'N' of transmission channels.

The processor 130 according to an embodiment may generate N zero-padded partial arrays for each of the N first partial arrays 331, 332, and 333 by merging K two-dimensional layers and at least one zero-padding layer added according to the above-described process.

For example, as illustrated in FIG. 8, the processor 130 may generate a zero-padded partial array 351 by merging one or more individual layers 341, 342, and 343 and zero-padding layers added to the individual layers 341, 342, and 343, respectively. Here, the zero-padded partial array 351 may be an array having a size increased in a chirp index direction, compared to the first partial array 331.

Figure 9:
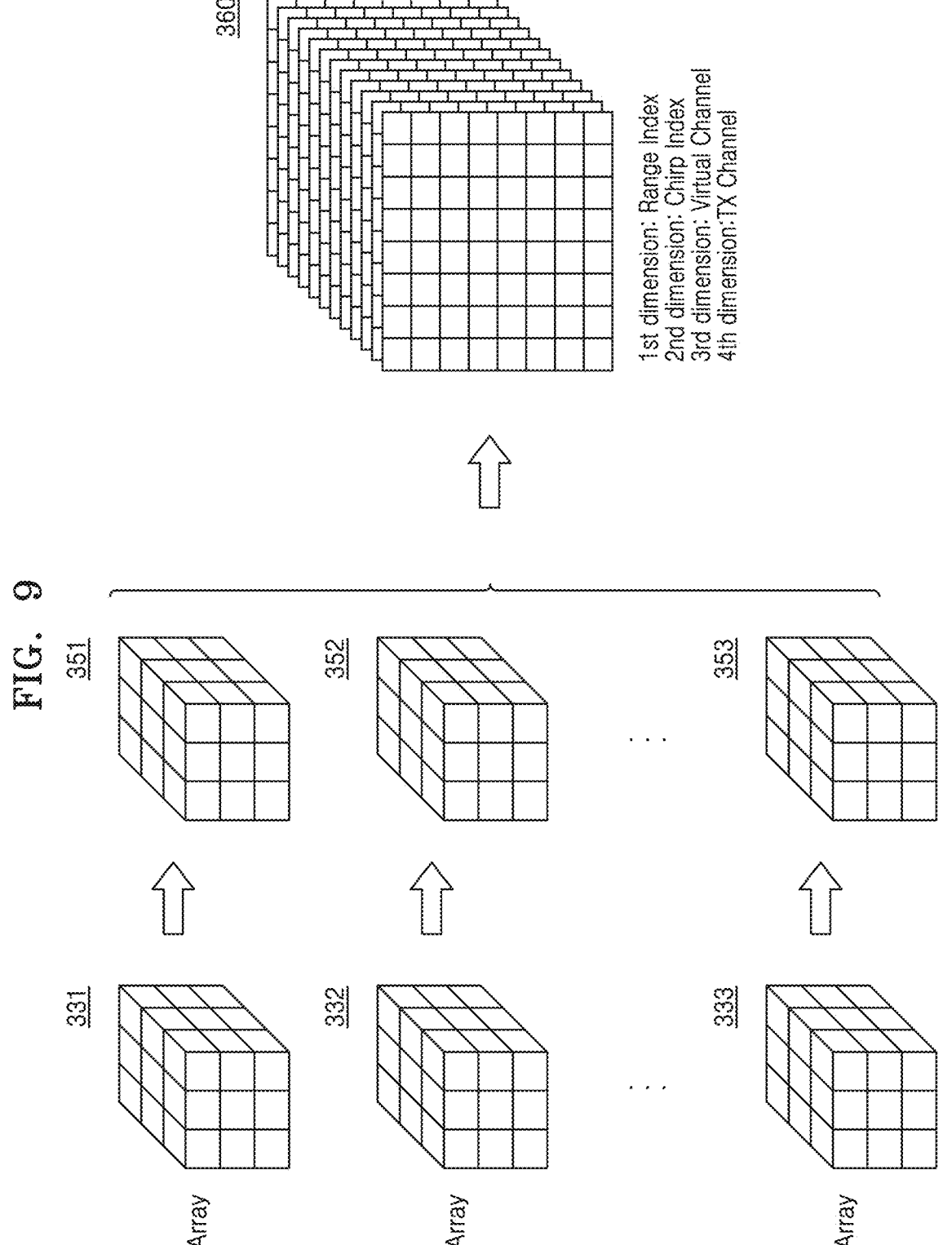
Figure 10:
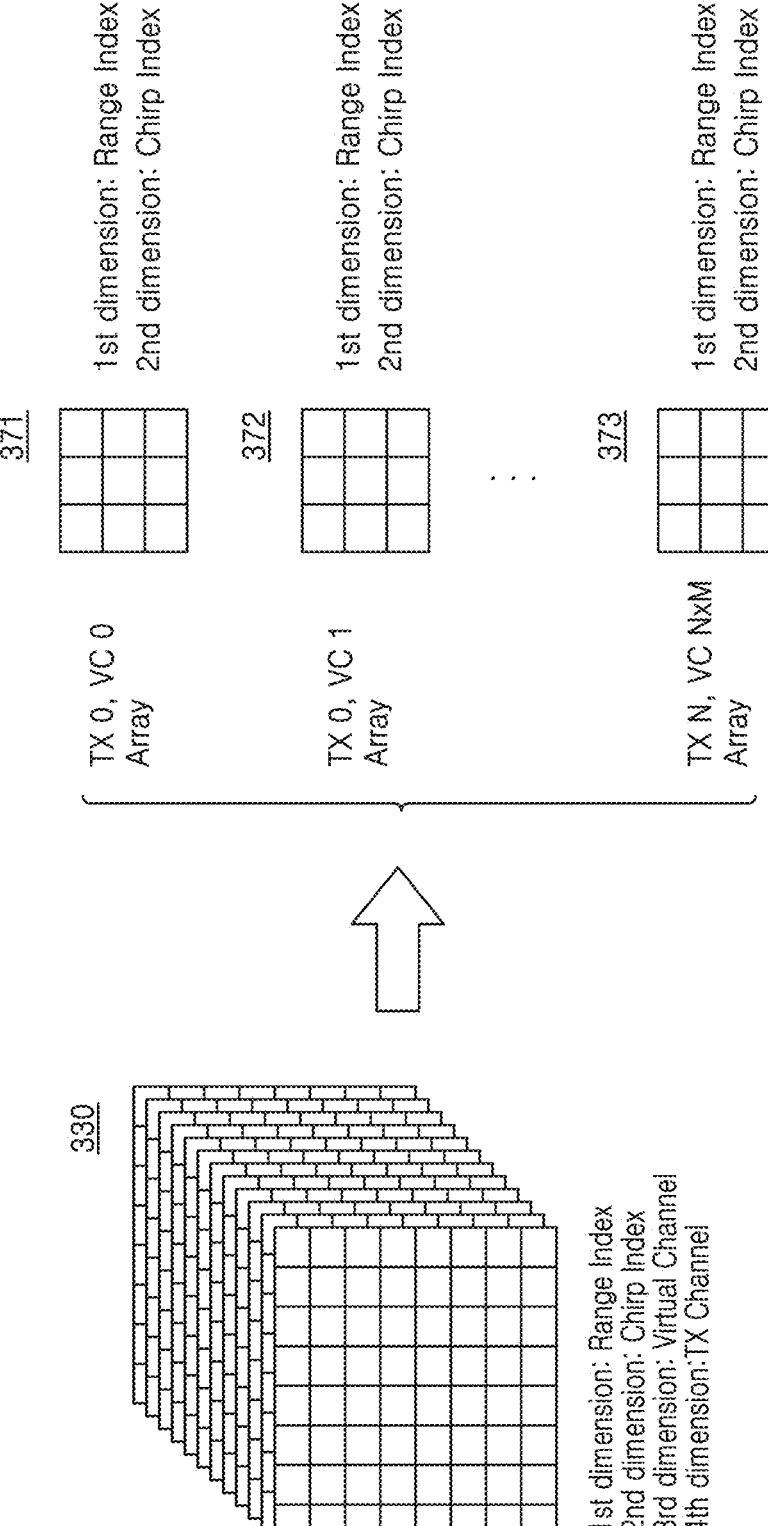
FIGS. 10 to 14 are views for illustrating a method of generating a third array, according to an embodiment of the present disclosure.

As illustrated in FIG. 9, the processor 130 according to an embodiment may generate a third array 360 by generating N zero-padded partial arrays 351, 352, and 353 from N first partial arrays 331, 332, and 333 and merging the generated N zero-padded partial arrays 351, 352, and 353.

Here, like the second array described above, a third array may be a four-dimensional array having a range index, a chirp index, a virtual channel, and a transmission channel as dimensions, respectively.

FIGS. 10 to 14 are views for illustrating a method of generating a third array, according to an embodiment of the present disclosure. Hereinafter, the method will be described with reference to FIGS. 10 to 14 together.

The processor 130 according to an embodiment may generate, from a second array 330, N×N×M second partial arrays 371, 372, and 373 which are arrays for respective N×M virtual channels for respective N transmission channels. For example, in an example in which N and M are each 4, the processor 130 may generate 64 second partial arrays. Here, each of the generated N×N×M second partial arrays 371, 372, and 373 may be a two-dimensional array in which a transmission channel dimension and a virtual channel dimension are removed from the second array 330, and may have a range index and a chirp index as dimensions, respectively.

Figure 11:
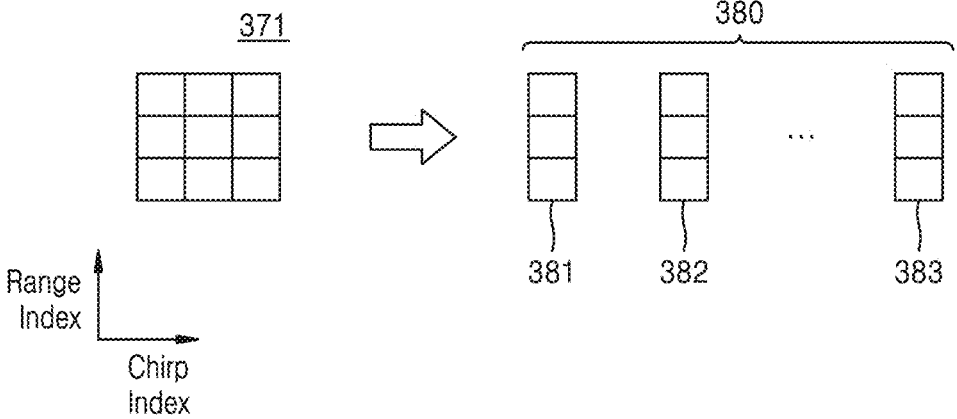

The processor 130 according to an embodiment may generate C columns from each of the generated N×N×M second partial arrays 371, 372, and 373. Here, each of the C columns may be obtained by dividing each of the second partial arrays on the basis of a chirp index. For example, as illustrated in FIG. 11, the processor 130 may generate C columns 380 from a second partial array 371. Here, the C columns 380 may include one or more individual columns 381, 382, and 383.

Figure 12:
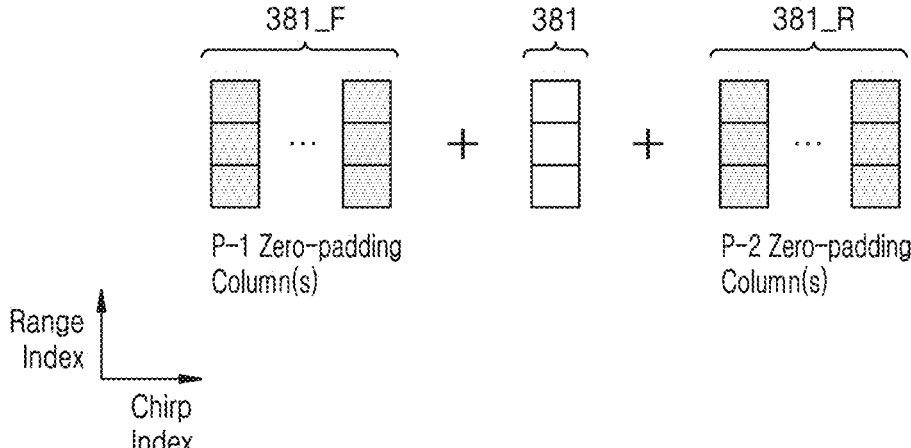

The processor 130 according to an embodiment may add, in a chirp index direction, at least one zero-padding column to each of the C columns. Here, the Zero-padding column may be a column including only 0. For example, as illustrated in FIG. 12, the processor 130 may add, in a chirp index direction, at least one column 381_F and 381_R to the first column 381 generated from the second partial array 371.

In more detail, the processor 130 according to an embodiment may identify a sequence number P (wherein P is a natural number) which is a sequence number of a transmission channel of a second partial array to which a zero-padding column is to be added. The processor 130 may add, in the chirp index direction, P-1 preceding zero-padding columns 381_F to each of the C columns. Also, the processor 130 may add, in the chirp index direction, P-2 following zero-padding columns 381_R to each of the C columns.

For example, for a second partial array in which N is 4 and J is 2, the processor 130 may add one preceding zero-padding column and two following zero-padding columns to each of the C columns.

The processor 130 according to an embodiment may generate a zero-padded partial array for each of the N×N×M second partial arrays 371, 372, and 373 by merging the C columns and at least one added zero-padding column.

Figure 13:
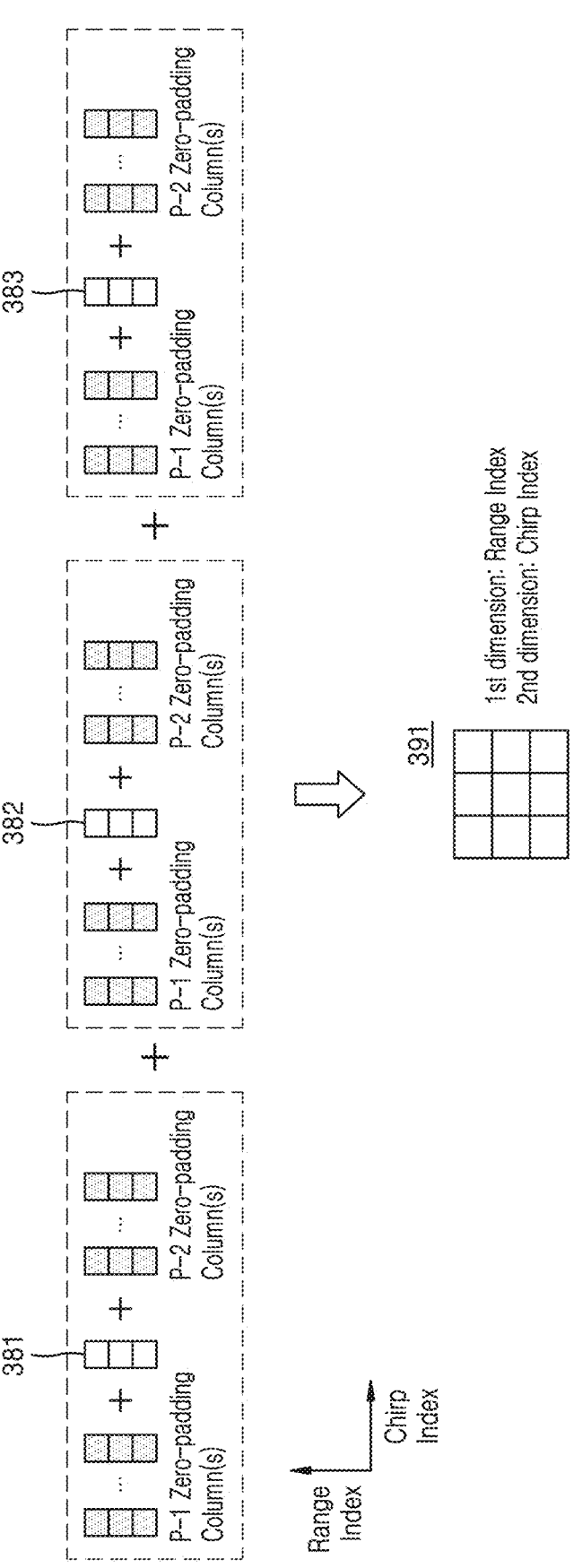

For example, as illustrated in FIG. 13, the processor 130 may generate a zero-padded partial array 391 by merging one or more individual columns 381, 382, 383 and zero-padding columns added to each of the individual columns 381, 382, and 383. Here, the zero-padded partial array 391 may also be an array having a size increased in a chirp index direction, compared to the second partial array 371.

Figure 14:
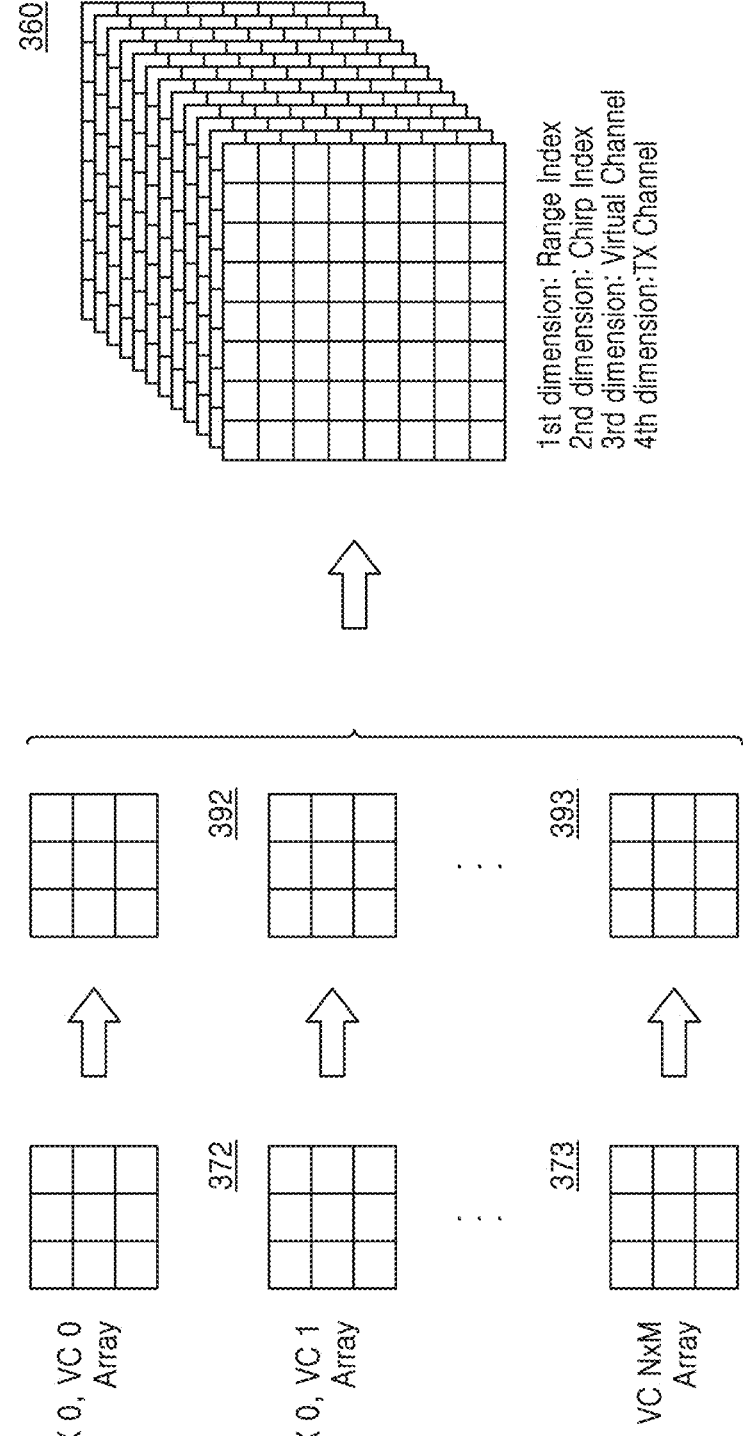

As illustrated in FIG. 14, the processor 130 according to an embodiment may generate a third array 360 by generating N×N×M zero-padded partial arrays 391, 392, and 393 from N×N×M second partial arrays 371, 372, and 373 and mering the generated N×N×M zero-padded partial arrays 391, 392, and 393. Here, like the second array 330 described above, the third array 360 may be a four-dimensional array having a range index, a chirp index, a virtual channel, and a transmission channel as dimensions, respectively.

Figure 15:
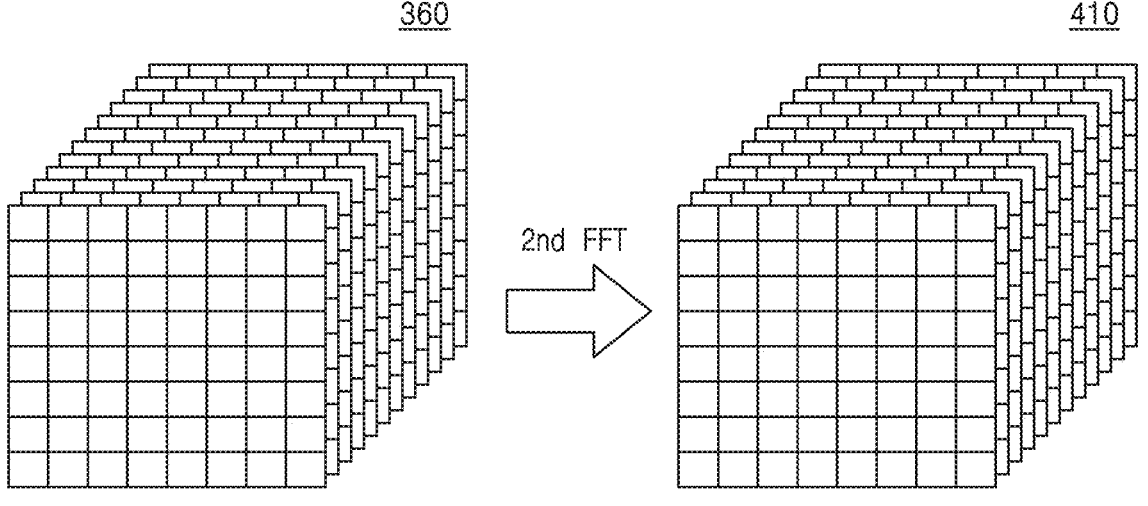
FIG. 15 is a view for illustrating a process of generating a fourth array by a processor, according to an embodiment of the present disclosure.

FIG. 15 is a view for illustrating a process of generating a fourth array 410 by the processor 130, according to an embodiment of the present disclosure.

The processor 130 according to an embodiment may generate the fourth array 410 by performing, in a chirp index dimension direction, FFT on each virtual channel of each of N transmission channels of the third array 360 generated according to the above-described process. Here, the fourth array may be a four-dimensional array having a range index, a Doppler index, a virtual channel, and a transmission channel as dimensions, respectively.

The processor 130 according to an embodiment may generate a range-Doppler map from the fourth array 410.

Figure 16:
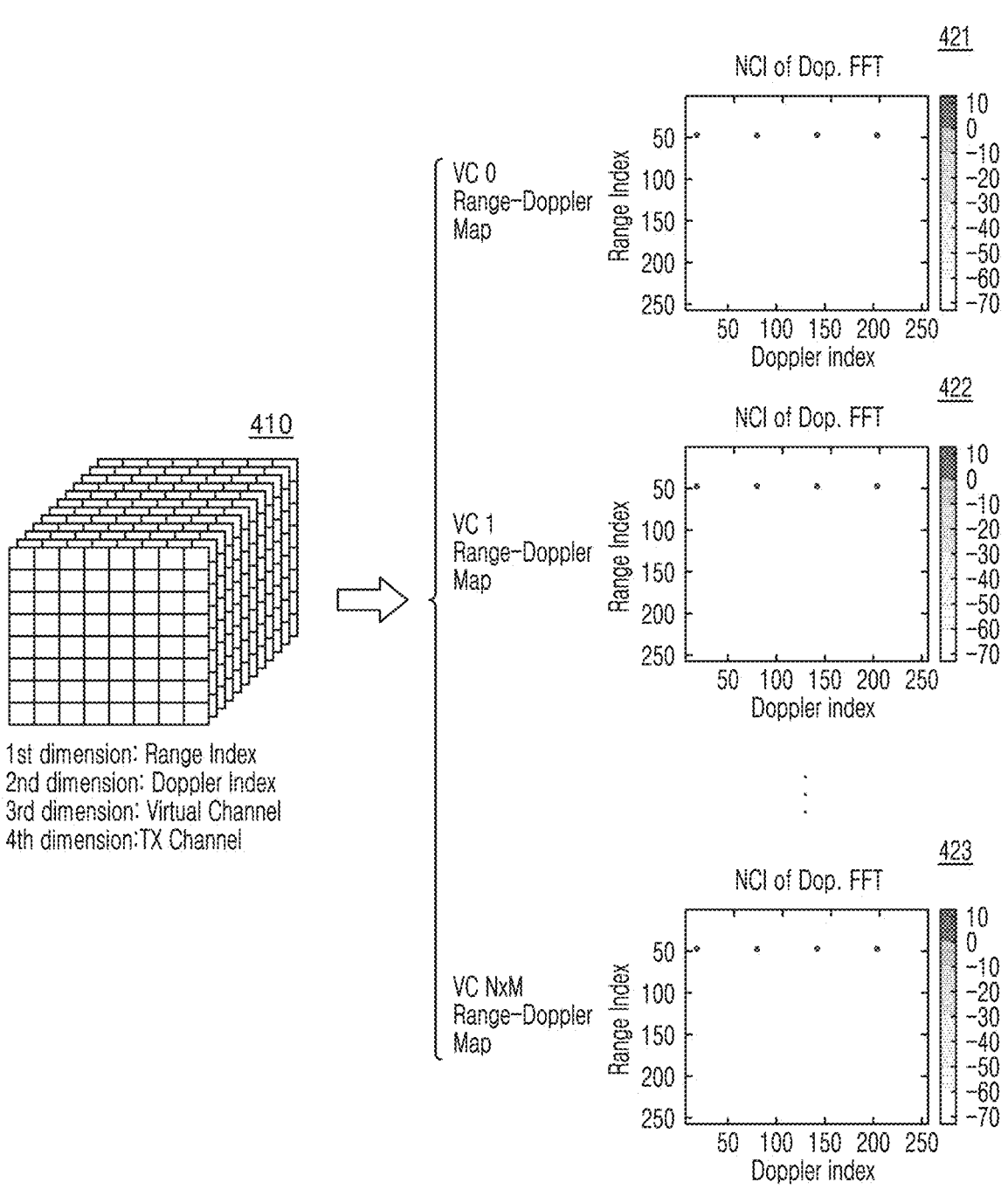
FIG. 16 is a view for illustrating a process of generating a range-Doppler map by a processor according to an embodiment of the present disclosure.

FIG. 16 is a view for illustrating a process of generating a range-Doppler map by the processor 130.

The processor 130 according to an embodiment may generate, from the fourth array 410, first range-Doppler maps 421, 422, and 423 for respective virtual channels by merging Doppler FFT results for respective N transmission channels on the basis of the respective virtual channels.

The processor 130 according to an embodiment may generate a second range-Doppler map by merging the first range-Doppler maps 421, 422, and 423 for the respective virtual channels, which are generated according to the above-described process.

The processor 130 according to an embodiment may use the second range-Doppler map in a peak extraction process described below.

The processor 130 according to an embodiment may generate a third range-Doppler map on the basis of at least one of the first range-Doppler maps 421, 422, and 423 for the respective virtual channel, which are generated according to the above-described process. For example, the processor 130 may generate the third range-Doppler map by merging only first range-Doppler maps for four of a total of 16 virtual channels. However, the generation of the third range-Doppler map described above is an example for illustration purposes only, and the spirit of the present disclosure is not limited thereto. Meanwhile, the processor 130 according to an embodiment may use the third range-Doppler map in a peak extraction process described below.

The processor 130 according to an embodiment may extract, from the second range-Doppler map (or the third range-Doppler map) generated according to the above-described process, L peaks (wherein L is a natural number) having a range index and a Doppler index satisfying a predetermined condition.

Figure 17:
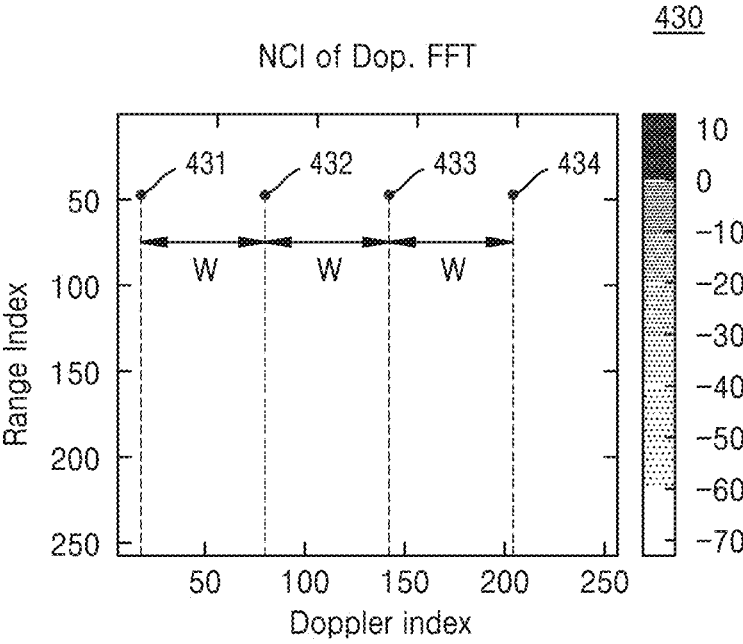
FIG. 17 is a graph for illustrating a process of extracting L peaks by a processor, according to an embodiment of the present disclosure.

FIG. 17 is a graph for illustrating a process of extracting L peaks 431, 432, 433, and 434 by the processor 130, according to an embodiment of the present disclosure.

In an embodiment, as illustrated in FIG. 17, a predetermined condition used by the processor 130 to extract the L peaks 431, 432, 433, and 434 may be a condition in which Doppler indexes among the L peaks 431, 432, 433, and 434 have intervals corresponding to a predetermined interval, and range index values of the L peaks 431, 432, 433, and 434 are within a threshold difference from a range index value of any one of the L peaks 431, 432, 433, and 434.

In other words, the processor 130 may extract, as the L peaks 431, 432, 433, and 434, points that are spaced apart from one another by a predetermined interval in a Doppler index direction and are within a predetermined threshold difference from a particular range index value.

The processor 130 according to an embodiment may extract, from among the L peaks 431, 432, 433, and 434, at least one peak having a phase difference, which is less than a predetermined threshold difference, on two adjacent virtual channels.

Figure 18:
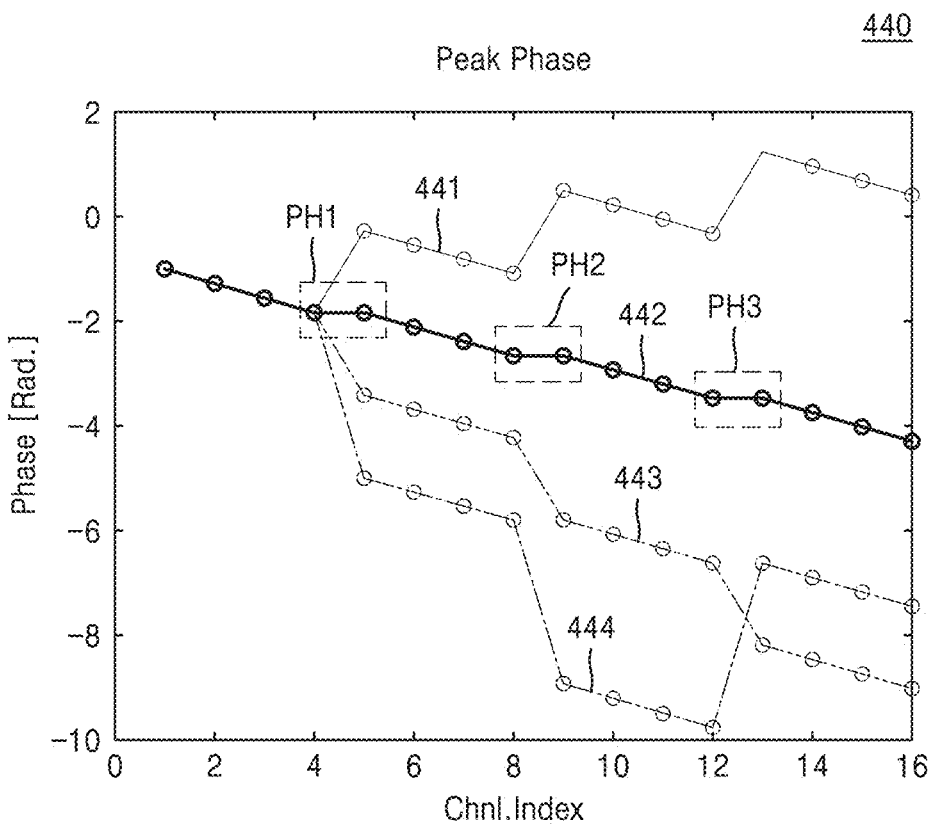
FIG. 18 is a graph for illustrating phases of L peaks on respective virtual channels according to an embodiment of the present disclosure.

FIG. 18 is a graph for illustrating phases of the L peaks 431, 432, 433, and 434 on respective virtual channels.

FIG. 18 illustrates that lines 441, 442, 443, and 444 show phases of the respective L peaks 431, 432, 433, and 434 on respective virtual channels.

The processor 130 according to an embodiment may identify phases of the respective L peaks 431, 432, 433, and 434 on respective virtual channels. Also, the processor 130 may calculate, for each of the L peaks 431, 432, 433, and 434, a phase difference between two adjacent virtual channels. The processor 130 may extract, from among the L peaks 431, 432, 433, and 434, a peak having a minimum value from among calculated phase differences.

Therefore, in the embodiment illustrated in FIG. 18, the processor 130 may identify that the line 442 shows, at three points PH1, PH2, and PH3, a phase difference, which is less than a predetermined threshold difference, between two adjacent virtual channels, and may extract the peak 432 corresponding to the line 442.

The processor 130 according to an embodiment may determine at least one physical quantity related to movement of the object 200 by using an extracted peak. For example, the processor 130 may calculate a movement speed, a movement direction, a relative location, and the like of the object 200. However, the calculation by the processor 130 is an example for illustration purposes only, and the spirit of the present disclosure is not limited thereto.

Figure 19:
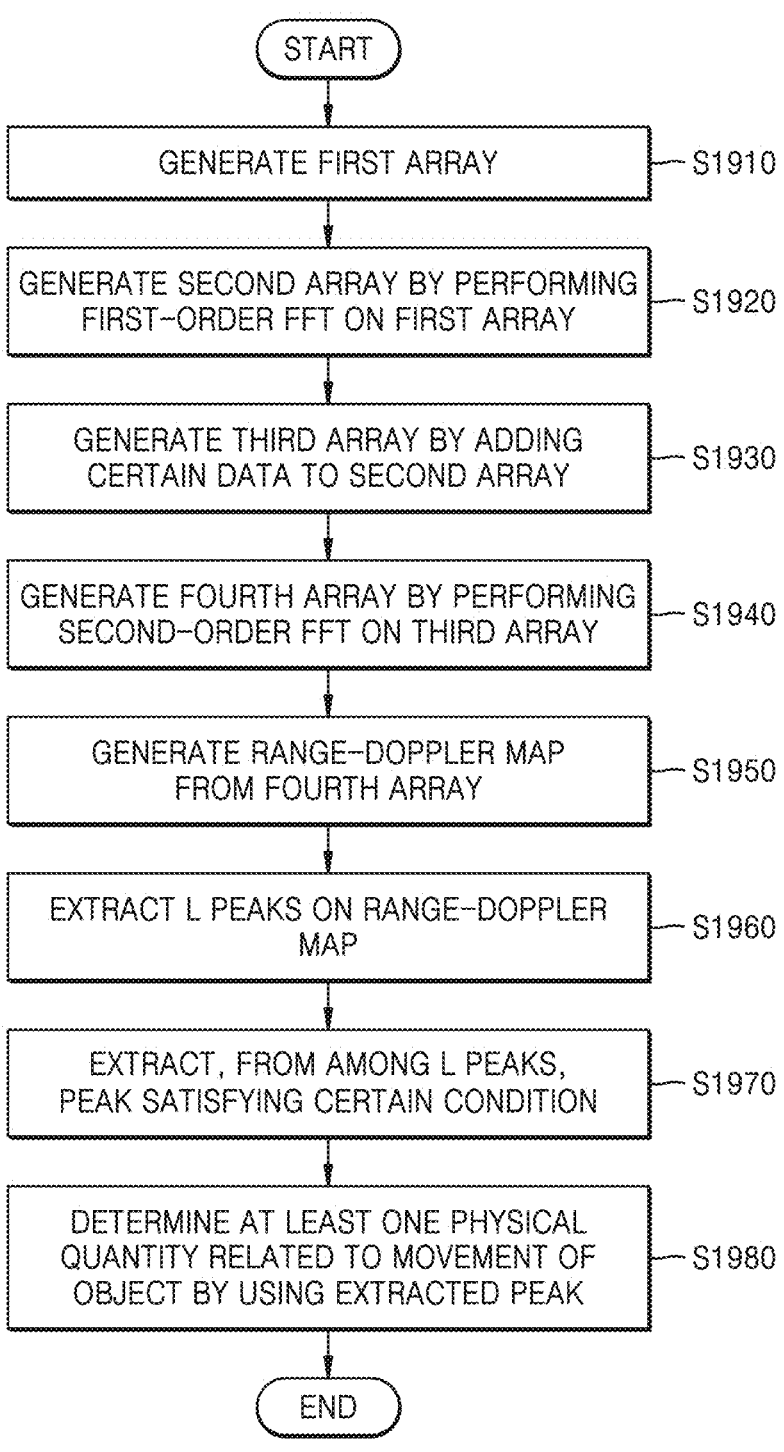
FIG. 19 is a flowchart for illustrating a radar sensing data processing method performed by the radar device, according to an embodiment of the present disclosure.

FIG. 19 is a flowchart for illustrating a radar sensing data processing method according to an embodiment of the present disclosure. The embodiment of the radar sensing data processing method illustrated in FIG. 19 may be performed by the radar device 100, although not required. Hereinafter, the radar sensing data processing method will be described with reference to FIGS. 1 to 18 again.

The radar device 100 according to an embodiment may transmit and receive a signal in units of frames. Here, one frame may include processes of transmitting a signal via each of a plurality of transmission channels and receiving a reflected signal via a plurality of virtual channels. For example, one frame may include a process of transmitting a signal via each of four transmission channels and a process of receiving a reflected signal via sixteen virtual channels.

The radar device 100 according to an embodiment may generate the bit signal 310 on the basis of the transmission signal and the reflected signal. The radar device 100 according to an embodiment may sample the bit signal 310 according to the predetermined sampling interval Ts.

In operation S1910, the radar device 100 according to an embodiment may generate the first array 320 by using a sampling value of the bit signal 310. Here, the first array 320 may refer to a four-dimensional array having a sampling index, a chirp index, a virtual channel, and a transmission channel as dimensions, respectively. Here, the sampling index may be a reference number indicating a sampling sequence number, and the chirp index may be a reference number indicating a sequence number of a chirp in one frame. An embodiment of an operation of generating the first array 320 by the radar device 100 is illustrated in FIG. 3.

In operation S1920, the radar device 100 according to an embodiment may generate the second array 330 by performing, in a sampling index dimension direction, range FFT on each virtual channel of each of N transmission channels of the first array 320 generated according to the above-described process. Here, the second array 330 may be a four-dimensional array having a range index, a chirp index, a virtual channel, and a transmission channel as dimensions, respectively. An embodiment of an operation of generating the second array 330 by the radar device 100 is illustrated in FIG. 4.

In operation S1930, the radar device 100 according to an embodiment may generate a third array by adding, in a chirp index dimension direction, predetermined data to the second array 330 according to different methods on the basis of N transmission channels. Here, the operation of adding the data on the basis of the N transmission channels may refer to an operation of adding data to the same transmission channels in the same manner.

An embodiment of an operation of generating the third array is illustrated in FIGS. 5 to 9. Hereinafter, the operation of generating the third array will be described in further detail with reference to FIGS. 5 to 9 together.

The radar device 100 according to an embodiment may generate, from the second array 330, the N first partial arrays 331, 332, and 333 which are arrays for the respective N transmission channels. Here, each of the N first partial arrays 331, 332, and 333 may be a three-dimensional array in which a transmission channel dimension is removed from the second array 330, and may have a range index, a chirp index, and a virtual channel as dimensions, respectively. For example, in an example in which N is 4, the radar device 100 may generate four first partial arrays.

Subsequently, the radar device 100 according to an embodiment may divide each of the generated N first partial arrays 331, 332, and 333 into the 'K' number of two-dimensional layers (wherein K is a natural number) defined by axes of a range index dimension and a virtual channel dimension on the basis of a chirp index. For example, as illustrated in FIG. 6, the radar device 100 may generate the K two-dimensional layers 340 from the first partial array 331. Here, the K two-dimensional layers 340 may include one or more individual layers 341, 342, and 343.

The radar device 100 according to an embodiment may add, in a chirp index direction, at least one zero-padding layer to each of the K two-dimensional layers of each of the N first partial arrays 331, 332, and 333. Here, the zero-padding layer may be a layer which is defined by axes of a range index dimension and a virtual channel dimension and includes only 0. For example, as illustrated in FIG. 7, the radar device 100 may add, in the chirp index direction, at least one zero-padding layer 341_F and 341_R to the first two-dimensional layer 341 generated from the first partial array 331.

In more detail, the radar device 100 according to an embodiment may identify a sequence number J (wherein J is a natural number) which is a sequence number of a transmission channel of a first partial array to which a zero-padding layer is to be added. The radar device 100 may add, in the chirp index direction, J-1 preceding zero-padding layers 341_F to each of K two-dimensional layers. The radar device 100 may add, in the chirp index direction, J-2 following zero-padding layers 341_R to each of K two-dimensional layers.

For example, for a first partial array in which N is 4 and J is 1, the radar device 100 may add 0 preceding zero-padding layers 341_F and three following zero-padding layers 341_R to each of K two-dimensional layers.

Meanwhile, in the embodiment of the present disclosure, K may correspond to a value obtained by dividing the number of chirps included in one frame by the number N of transmission channels.

The radar device 10 according to an embodiment may generate N zero-padded partial arrays for each of the N first partial arrays 331, 332, and 333 by merging K two-dimensional layers and at least one zero-padding layer added according to the above-described process.

For example, as illustrated in FIG. 8, the radar device 100 may generate the zero-padded partial array 351 by merging one or more individual layers 341, 342, and 343 and zero-padding layers added to each of the individual layers 341, 342, and 343. Here, the zero-padded partial array 351 may be an array having a size increased in a chirp index direction, compared to the first partial array 331.

As illustrated in FIG. 9, the radar device 100 according to an embodiment may generate the third array 360 by generating the N zero-padded partial arrays 351, 352, and 353 from the N first partial arrays 331, 332, and 333 and merging the generated N zero-padded partial arrays 351, 352, and 353.

Here, like an example of the second array described above, the third array may be a four-dimensional array having a range index, a chirp index, a virtual channel, and a transmission channel as dimensions, respectively.

An embodiment of an operation of generating the third array is illustrated in FIGS. 10 to 14. Hereinafter, the operation of generating the third array will be described in further detail with reference to FIGS. 10 to 14 together.

The radar device 100 according to an embodiment may generate, from the second array 330, the N×N×M second partial arrays 371, 372, and 373 which are arrays for respective N×M virtual channels for respective N transmission channels. For example, in an example in which N and M are each 4, the radar device 100 may generate 64 second partial arrays. Here, each of the generated N×N×M second partial arrays 371, 372, and 373 may be a two-dimensional array in which a transmission channel dimension and a virtual channel dimension are removed from the second array 330, and may have a range index and a chirp index as dimensions, respectively.

The radar device 100 according to an embodiment may generate C columns from each of the generated N×N×M second partial arrays 371, 372, and 373. Here, each of the C columns may be obtained by dividing each of the second partial arrays on the basis of a chirp index. For example, as illustrated in FIG. 11, the radar device 100 may generate the C columns 380 from the second partial array 371. Here, the C columns 380 may include one or more individual columns 381, 382, and 383.

The radar device 100 according to an embodiment may add, in a chirp index direction, at least one zero-padding column to each of C columns. Here, a Zero-padding column may be a column including only 0. For example, as illustrated in FIG. 12, the radar device 100 may add, in the chirp index direction, at least one column 381_F and 381_R to the first column 381 generated from the second partial array 371.

In more detail, the radar device 100 according to an embodiment may identify a sequence number P (wherein P is a natural number) which is a sequence number of a transmission channel of a second partial array to which a zero-padding column is to be added. The radar device 100 may add, in the chirp index direction, P-1 preceding zero-padding columns 381_F to each of the C columns. Also, the radar device 100 may add, in the chirp index direction, P-2 following zero-padding columns 381_R to each of the C columns.

For example, for a second partial array in which N is 4 and J is 2, the radar device 100 may add one preceding zero-padding column and two following zero-padding columns to each of the C columns.

The radar device 100 according to an embodiment may generate a zero-padded partial array for each of the N×N×M second partial arrays 371, 372, and 373 by merging the C columns and at least one added zero-padding column.

For example, as illustrated in FIG. 13, the radar device 100 may generate the zero-padded partial array 391 by merging one or more individual columns 381, 382, 383 and zero-padding columns added to each of the individual columns 381, 382, and 383. Here, the zero-padded partial array 391 may also be an array having a size increased in the chirp index direction, compared to the second partial array 371.

As illustrated in FIG. 14, the radar device 100 according to an embodiment may generate the third array 360 by generate the N×N×M zero-padded partial arrays 391, 392, and 393 from the N×N×M second partial arrays 371, 372, and 373 and mering the generated N×N×M zero-padded partial arrays 391, 392, and 393. Here, like an example of the second array 330 described above, the third array 360 may be a four-dimensional array having a range index, a chirp index, a virtual channel, and a transmission channel as dimensions, respectively.

In operation S1940, the radar device 100 according to an embodiment may generate the fourth array 410 by performing, in a chirp index dimension direction, FFT on each virtual channel of each of N transmission channels of the third array 360 generated according to the above-described process. Here, the fourth array 410 may be a four-dimensional array having a range index, a Doppler index, a virtual channel, and a transmission channel as dimensions, respectively. An embodiment of an operation of generating the fourth array 410 by the radar device 100 is illustrated in FIG. 15.

In operation S1950, the radar device 100 according to an embodiment may generate a range-Doppler map from the fourth array 410.

An embodiment of an operation of generating a range-Doppler map by the radar device 100 is illustrated in FIG. 16.

The radar device 100 according to an embodiment may generate, from the fourth array 410, the first range-Doppler maps 421, 422, and 423 for respective virtual channels by merging Doppler FFT results for respective N transmission channels on the basis of the respective virtual channels.

The radar device 100 according to an embodiment may generate a second range-Doppler map by merging the first range-Doppler maps 421, 422, and 423 for the respective virtual channels, which are generated according to the above-described process.

The radar device 100 according to an embodiment may use the second range-Doppler map in a peak extraction process described below.

The radar device 100 according to an embodiment may generate a third range-Doppler map on the basis of at least one of the first range-Doppler maps 421, 422, and 423 for the respective virtual channel, which are generated according to the above-described process. For example, the radar device 100 may generate the third range-Doppler map by merging only first range-Doppler maps for four of a total of 16 virtual channels. However, the generation of the third range-Doppler map by the radar device 100 is an example for illustration purposes only, and the spirit of the present disclosure is not limited thereto. The radar device 100 according to an embodiment may use the third range-Doppler map in a peak extraction process described below.

In operation S1960, the radar device 100 according to an embodiment may extract, from the second range-Doppler map (or the third range-Doppler map) generated according to the above-described process, L peaks (wherein L is a natural number) having a range index and a Doppler index satisfying a predetermined condition.

FIG. 17 show an example of a process of extracting the L peaks 431, 432, 433, and 434 by the radar device 100.

In the embodiment illustrated in FIG. 17, a predetermined condition used by the radar device 100 to extract the L peaks 431, 432, 433, and 434 may be a condition in which Doppler indexes among the L peaks 431, 432, 433, and 434 have intervals corresponding to a predetermined interval, and range index values of the L peaks 431, 432, 433, and 434 are within a threshold difference from a range index value of any one of the L peaks 431, 432, 433, and 434.

In other words, the radar device 100 may extract, as the L peaks 431, 432, 433, and 434, points that are spaced apart from one another by a predetermined interval in a Doppler index direction and are within a predetermined threshold difference from a particular range index value.

In operation S1970, the radar device 100 according to an embodiment may extract, from among the L peaks 431, 432, 433, and 434, at least one peak having a phase difference, which is less than a predetermined threshold difference, on two adjacent virtual channels.

FIG. 18 is a graph illustrating phases of the L peaks 431, 432, 433, and 434 on respective virtual channels.

The lines 441, 442, 443, and 444 in the graph of FIG. 18 show phases of the respective L peaks 431, 432, 433, and 434 on respective virtual channels.

The radar device 100 according to an embodiment may identify phases of the respective L peaks 431, 432, 433, and 434 on respective virtual channels. Also, the radar device 100 may calculate, for each of the L peaks 431, 432, 433, and 434, a phase difference between two adjacent virtual channels. The radar device 100 may extract, from among the L peaks 431, 432, 433, and 434, a peak having a minimum value from among calculated phase differences.

Therefore, as illustrated in FIG. 18, the radar device 100 may identify that the line 442 shows, at the three points PH1, PH2, and PH3, a phase difference, which is less than a predetermined threshold difference, between two adjacent virtual channels, and may extract the peak 432 corresponding to the line 442.

In operation S1980, the radar device 100 according to an embodiment may determine at least one physical quantity related to movement of the object 200 by using the extracted peak. For example, the radar device 100 may calculate a movement speed, a movement direction, a relative location, and the like of the object 200. However, the calculation by the radar device 100 is an example for illustration purposes only, and the spirit of the present disclosure is not limited thereto.

A radar system using a plurality of antennas according to some embodiment of the present disclosure may reduce or overcome speed ambiguity even without distortion of a signal.

Embodiments according to the disclosure described above may be implemented in the form of a computer program that may be executed through various components on a computer, and the computer program may be recorded in a computer-readable medium. Here, the medium may store a program executable by a computer. Examples of the medium may include a magnetic medium, such as a hard disk, a floppy disk, and a magnetic tape, an optical recording medium, such as CD-ROM and DVD, a magneto-optical medium, such as a floptical disk, and memory, such as ROM, RAM, and flash memory, configured to store program instructions.

Meanwhile, the computer program may be specially designed and configured for the disclosure, or may be known to and used by one of ordinary skill in the art of computer software. Examples of the computer program may include high-level language code that may be executed by a computer by using an interpreter or the like, as well as machine language code created by a compiler.

Particular executions described in the disclosure are embodiments and do not limit the scope of the disclosure in any way. For conciseness of the description, the description of existing electronic components, control systems, software, and other functional aspects of the systems may be omitted. In addition, line connections or connection members between components shown in the drawings illustratively indicate functional connections and/or physical or circuit connections, and may be represented in actual devices as alternative or additional various functional connections, physical connections, or circuit connections. In addition, unless specifically stated, such as "essential" or "importantly", the components may not be necessarily required for the application of the disclosure.

Therefore, the spirit of the disclosure should not be limited to the above-described embodiments, and not only claims described below but also all the scope equivalent to the claims or equivalently changed from the claims falls within the scope of the spirit of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method for processing radar sensing data by a time division multiplexing (TDM) frequency modulation continuous wave (FMCW) radar device, the method comprising:

generating a first array by using signals emitted and received by the TDM FMCW radar device, the first array being a four-dimensional array having a sampling index, a chirp index, a virtual channel, and a transmission channel, as dimensions, respectively, wherein the TDM FMCW radar device has N×M virtual channels implemented by N transmission channels (N is a natural number more than 1) and M reception channels (M is a natural number more than 1), and locations of at least some channels of the N×M virtual channels overlap each other;

generating a second array by performing, in a sampling index dimension direction, range fast Fourier transform (FFT) on each virtual channel of each of the N transmission channels of the first array, the second array being a four-dimensional array having a range index, a chirp index, a virtual channel, and a transmission channel as dimensions, respectively;

generating a third array by adding, in a chirp index dimension direction, predetermined data to the second array based on the N transmission channels;

generating a fourth array by performing, in the chirp index dimension direction, the FFT on each virtual channel of each of the N transmission channels of the third array, the fourth array being a four-dimensional array having a range index, a Doppler index, a virtual channel, and a transmission channel as dimensions, respectively;

generating a range-Doppler map from the fourth array;

extracting, from the range-Doppler map, L peaks (L is a natural number) having a range index and a Doppler index satisfying a predetermined condition;

extracting, from among the L peaks, at least one peak having a phase difference of two adjacent virtual channels, which is less than a predetermined threshold difference; and determining at least one physical quantity related to movement of an object by using the extracted peak.

2. The method of claim 1, wherein the generating of the third array includes:

generating, from the second array, N first partial arrays which are arrays for each of the N transmission channels;

dividing each of the N first partial arrays into K two-dimensional layers (K is a natural number) defined by axes of a dimension of a range index of each of the N first partial arrays and a dimension of a virtual channel of each of the N first partial arrays based on a chirp index of each of the N first partial arrays;

adding, in a chirp index direction, at least one zero-padding layer to each of the K two-dimensional layers of each of the N first partial arrays, the zero-padding layer being a layer defined by the axes of the dimension of the range index of each of the N first partial arrays and the dimension of the virtual channel of each of the N first partial arrays and including only zero; and generating the third array by generating N zero-padded partial arrays for each of the N first partial arrays by merging the K two-dimensional layers and the added at least one zero-padding layer, and merging the generated N zero-padded partial arrays.

3. The method of claim 2, wherein the adding of the at least one zero-padding layer to each of the K two-dimensional layers of each of the N first partial arrays includes:

identifying a sequence number J (J is a natural number) which is a sequence number of a transmission channel of a first partial array to which the zero-padding layer is to be added;

adding, in the chirp index direction, J-1 preceding zero-padding layers to each of the K two-dimensional layers; and adding, in the chirp index direction, J-2 following zero-padding layers to each of the K two-dimensional layers.

4. The method of claim 1, wherein the generating of the third array includes:

generating, from the second array, N×N×M second partial arrays which are arrays for each of the N×M virtual channels for each of the N transmission channels;

generating C columns from each of the second partial arrays, each of the C columns being obtained by dividing each of the second partial arrays based on the chirp index of the second array;

adding at least one zero-padding column to each of the C columns, the zero-padding column being a column including only zero; and generating the third array by generating zero-padded partial arrays for each of the second partial arrays by merging the C columns and the added at least one zero-padding column, and merging the generated zero-padded partial arrays.

5. The method of claim 4, wherein the adding of the at least one zero-padding column to each of the C columns includes:

identifying a sequence number P (P is a natural number) which is a sequence number of a transmission channel of a second partial array to which the zero-padding column is to be added;

adding, in a chirp index direction, P-1 preceding zero-padding columns to each of the C columns; and adding, in the chirp index direction, P-2 following zero-padding columns to each of the C columns.

6. The method of claim 1, wherein the generating of the range-Doppler map includes:

generating, from the fourth array, first range-Doppler maps for each of the virtual channels by merging Doppler FFT results for each of the N transmission channels based on each of the virtual channels; and generating a second range-Doppler map by merging the first range-Doppler maps for each of the virtual channels, wherein the extracting of the L peaks from the range-Doppler map includes extracting the L peaks from the second range-Doppler map.

7. The method of claim 6, wherein the generating of the range-Doppler map further includes generating a third range-Doppler map based on at least one of the first range-Doppler maps for each of the virtual channels, wherein the extracting of the L peaks from the range-Doppler map includes extracting the L peaks from the third range-Doppler map.

8. The method of claim 1, wherein the predetermined condition for extracting the L peaks includes a condition in which Doppler indexes between the L peaks have intervals corresponding to a predetermined interval, and range index values of the L peaks are within a threshold difference from one of the range index values of the L peaks.

9. The method of claim 1, wherein the extracting of the at least one peak from among the L peaks includes:

identifying phases of each of the L peaks on each of the virtual channels;

calculating, for each of the L peaks, phase differences between two adjacent virtual channels of the virtual channels; and extracting, from among the L peaks, a peak having a lowest value from among the calculated phase differences.

10. A time division multiplexing (TDM) frequency modulation continuous wave (FMCW) radar device comprising:

an antenna unit including N transmission antennas (N is a natural number greater than or equal to 2), M reception antennas (M is a natural number greater than or equal to 2), and N×M virtual antennas implemented according to an array of the N transmission antennas and the M reception antennas, wherein locations of at least some channels of the N×M virtual antennas overlap each other;

a radar integrated circuit (IC) configured to process signals transmitted and received by the antenna unit; and a processor configured to determine at least one physical quantity related to movement of an object by analyzing the received signals, wherein the processor is configured to: generate a first array by using the signals transmitted and received via the antenna unit, the first array being a four-dimensional array having a sampling index, a chirp index, a virtual channel, and a transmission channel as dimensions, respectively; generate a second array by performing, in a sampling index dimension direction, range fast Fourier transform (FFT) on each virtual channel of each of the N transmission channels of the first array, the second array being a four-dimensional array having a range index, a chirp index, a virtual channel, and a transmission channel as dimensions, respectively; generate a third array by adding, in a chirp index dimension direction, predetermined data to the second array based on the N transmission channels; generate a fourth array by performing, in the chirp index dimension direction, FFT on each virtual channel of each of the N transmission channels of the third array, the fourth array being a four-dimensional array having a range index, a Doppler index, a virtual channel, and a transmission channel as dimensions, respectively; generate a range-Doppler map from the fourth array; extract, from the range-Doppler map, L peaks (L is a natural number) having a range index and a Doppler index satisfying a predetermined condition; extract, from among the L peaks, at least one peak having a phase difference of two adjacent virtual channels, which is less than a predetermined threshold difference; and determine at least one physical quantity related to the movement of the object by using the extracted peak.

11. The TDM FMCW radar device of claim 10, wherein the processor is configured to: generate, from the second array, N first partial arrays which are arrays for each of the N transmission channels; divide each of the N first partial arrays into K two-dimensional layers (K is a natural number) defined by axes of a dimension of a range index of each of the N first partial arrays and a dimension of a virtual channel of each of the N first partial arrays based on a chirp index of each of the N first partial arrays; add, in a chirp index direction, at least one zero-padding layer to each of the K two-dimensional layers of each of the N first partial arrays, the zero-padding layer being a layer defined by the axes of the dimension of the range index of each of the N first partial arrays and the dimension of the virtual channel of each of the N first partial arrays and including only zero; and generate the third array by generating N zero-padded partial arrays for each of the N first partial arrays by merging the K two-dimensional layers and the added at least one zero-padding layer, and merging the generated N zero-padded partial arrays.

12. The TDM FMCW radar device of claim 11, wherein the processor is configured to: identify a sequence number J (J is a natural number) which is a sequence number of a transmission channel of a first partial array to which the zero-padding layer is to be added; add, in the chirp index direction, J-1 preceding zero-padding layers to each of the K two-dimensional layers; and add, in the chirp index direction, J-2 following zero-padding layers to each of the K two-dimensional layers.

13. The TDM FMCW radar device of claim 10, wherein the processor is configured to: generate, from the second array, N×N×M second partial arrays which are arrays of each of the N×M virtual channels for each of the N transmission channels; generate C columns from each of the second partial arrays, each of the C columns being obtained by dividing each of the second partial arrays based on the chirp index of the second array; add at least one zero-padding column to each of the C columns, the zero-padding column being a column including only zero; and generate the third array by generating zero-padded partial arrays for each of the second partial arrays by merging the C columns and the added at least one zero-padding column, and merging the generated zero-padded partial arrays.

14. The TDM FMCW radar device of claim 13, wherein the processor is configured to: identify a sequence number P (P is a natural number) which is a sequence number of a transmission channel of a second partial array to which the zero-padding column is to be added; add, in a chirp index direction, P-1 preceding zero-padding columns to each of the C columns; and add, in the chirp index direction, P-2 following zero-padding columns to each of the C columns.

15. The TDM FMCW radar device of claim 10, wherein the processor is configured to: generate, from the fourth array, first range-Doppler maps for each of the virtual channels by merging Doppler FFT results for each of the N transmission channels based on each of the virtual channels; generate a second range-Doppler map by merging the first range-Doppler maps for each of the virtual channels; and extract the L peaks from the second range-Doppler map.

16. The TDM FMCW radar device of claim 15, wherein the processor is configured to: generate a third range-Doppler map based on at least one of the first range-Doppler maps for each the virtual channels; and extract the L peaks from the third range-Doppler map.

17. The TDM FMCW radar device of claim 10, wherein the predetermined condition for extracting the L peaks includes a condition in which Doppler indexes between the L peaks have intervals corresponding to a predetermined interval, and range index values of the L peaks are within a threshold difference from one of the range index values of the L peaks.

18. The TDM FMCW radar device of claim 10, wherein the processor is configured to: identify phases of each of the L peaks on each of the virtual channels; calculate, for each of the L peaks, phase differences between two adjacent virtual channels of the virtual channel; and extract, from among the L peaks, a peak having a lowest value from among the calculated phase differences.

19. A vehicle comprising:

a vehicle body including a controller configured to control a vehicle; and a radar device configured to provide information of sensing a surrounding object via the controller, wherein the radar device includes: an antenna unit including N transmission antennas (N is a natural number greater than or equal to 2), M reception antennas (M is a natural number greater than or equal to 2), and N×M virtual antennas implemented according to an array of the N transmission antennas and the M reception antennas, wherein locations of at least some channels of the N×M virtual antennas overlap each other; a radar integrated circuit (IC) configured to process signals transmitted and received by the antenna unit; and a processor configured to determine at least one physical quantity related to movement of the object by analyzing the received signals, wherein the processor is configured to: generate a first array by using the signal transmitted and received via the antenna unit, the first array being a four-dimensional array having a sampling index, a chirp index, a virtual channel, and a transmission channel, as dimensions, respectively; generate a second array by performing, in a sampling index dimension direction, range fast Fourier transform (FFT) on each virtual channel of each of the N transmission channels of the first array, the second array being a four-dimensional array having a range index, a chirp index, a virtual channel, and a transmission channel as dimensions, respectively; generate a third array by adding, in a chirp index dimension direction, predetermined data to the second array based on the N transmission channels; generate a fourth array by performing, in a chirp index dimension direction, FFT on each virtual channel of each of the N transmission channels of the third array, the fourth array being a four-dimensional array having a range index, a Doppler index, a virtual channel, and a transmission channel as dimension, respectively; generate a range-Doppler map from the fourth array; extract, from the range-Doppler map, L peaks (L is a natural number) having a range index and a Doppler index satisfying a predetermined condition; extract, from among the L peaks, at least one peak having a phase difference of two adjacent virtual channels, which is less than a predetermined threshold difference; and determine at least one physical quantity related to movement of the object by using the extracted peak.

* * * * *